United States Patent
Yamamoto

(10) Patent No.: US 8,704,933 B2
(45) Date of Patent: Apr. 22, 2014

(54) FOCUS DETECTION APPARATUS

(75) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 13/319,199

(22) PCT Filed: May 7, 2010

(86) PCT No.: PCT/JP2010/058144
§ 371 (c)(1),
(2), (4) Date: Nov. 7, 2011

(87) PCT Pub. No.: WO2010/131725
PCT Pub. Date: Nov. 18, 2010

(65) Prior Publication Data
US 2012/0057043 A1   Mar. 8, 2012

(30) Foreign Application Priority Data

May 12, 2009  (JP) ................................. 2009-115920
Apr. 26, 2010  (JP) ................................. 2010-101439

(51) Int. Cl.
G02B 13/16   (2006.01)
H04N 5/225   (2006.01)

(52) U.S. Cl.
USPC ............ 348/335; 348/340; 348/345; 348/348

(58) Field of Classification Search
USPC .......... 348/335, 340, 345, 348, 349, 350, 352
See application file for complete search history.

(56) References Cited

U.S. PATENT DOCUMENTS

| | | | |
|---|---|---|---|
| 2002/0121652 A1 | 9/2002 | Yamasaki | |
| 2004/0179128 A1 | 9/2004 | Oikawa | |
| 2008/0259202 A1 | 10/2008 | Fujii | |
| 2009/0096886 A1* | 4/2009 | Kusaka | ..................... 348/222.1 |

FOREIGN PATENT DOCUMENTS

| | | |
|---|---|---|
| CN | 1782772 A | 6/2006 |
| CN | 101193209 A | 6/2008 |
| JP | 58-024105 A | 2/1983 |
| JP | 5-127074 A | 5/1993 |
| JP | 6-102451 A | 4/1994 |

(Continued)

OTHER PUBLICATIONS

Chinese Office Action issued in corresponding application No. 201080021294.6 on Apr. 3, 2013.

(Continued)

Primary Examiner — Yogesh Aggarwal
(74) Attorney, Agent, or Firm — Carter, DeLuca, Farrell & Schmidt, LLP

(57) ABSTRACT

A focus detection apparatus comprises photo-electric conversion means comprising a first pixel group which receives a light beam passing through a first pupil area of an image forming optical system that forms an image of an object, and a second pixel group which receives a light beam passing through a second pupil area of the image forming optical system; focus detection means for detecting a focus state of the image forming optical system based on a first object image generated by the first pixel group and a second object image generated by the second pixel group; a correction calculator for performing correction calculation for the first object image and the second object image based on the output from the focus detection means; and determination means for determining, based on the output from the focus detection means, whether to perform the correction calculation again.

9 Claims, 19 Drawing Sheets

(56) References Cited

FOREIGN PATENT DOCUMENTS

| | | |
|---|---|---|
| JP | 2959142 A | 7/1999 |
| JP | 2002-165126 A | 6/2002 |
| JP | 2002-350716 A | 12/2002 |
| JP | 2004-191629 A | 7/2004 |
| JP | 2005-106994 A | 4/2005 |
| JP | 2006-154465 A | 6/2006 |
| JP | 2008-191559 A | 8/2008 |
| JP | 2009-042370 A | 2/2009 |

OTHER PUBLICATIONS

European Search Report issued in corresponding application No. 10774982.2 on May 14, 2013.

Chinese Office Action issued in corresponding application No. 201080021294.6 on Feb. 17, 2014.

* cited by examiner

F I G. 10A 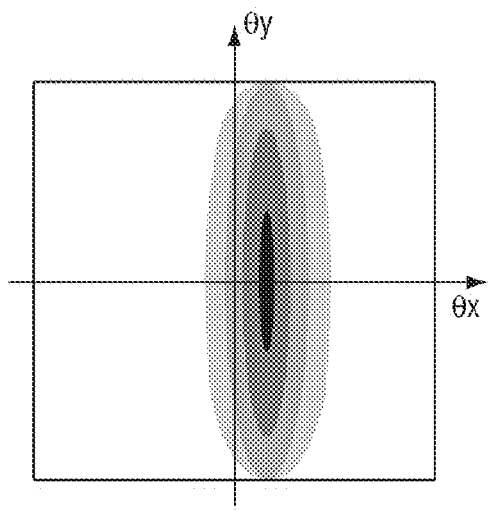
F I G. 10B 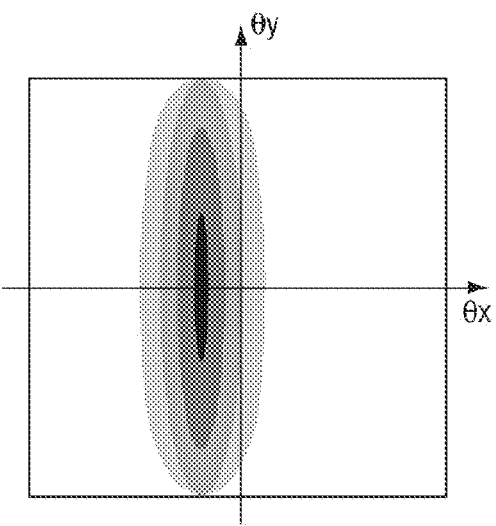
F I G. 10C 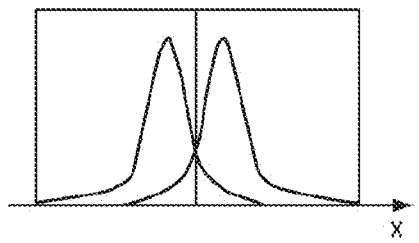

FOCUS DETECTION APPARATUS

TECHNICAL FIELD

The present invention relates to a focus detection technique in an image capturing apparatus.

BACKGROUND ART

As one scheme of detecting the focus state of an imaging lens, Japanese Patent Laid-Open No. 58-24105 (to be referred to as "patent reference 1" hereinafter) discloses an apparatus that performs focus detection of the pupil division scheme using a two-dimensional sensor having pixels in each of which a microlens is formed. The apparatus in patent reference 1 is configured such that a photo-electric conversion unit in each pixel which constitutes the sensor is divided into a plurality of photo-electric conversion units, which receive light beams in different areas on the pupil of the imaging lens via the microlens.

Also, Japanese Patent No. 2959142 (to be referred to as "patent reference 2" hereinafter) discloses a solid-state image sensor, which serves both as an image sensor and a focus detector and has a two-dimensional array of pixels in which the relative positions between microlenses and photo-electric conversion units are shifted from each other. The solid-state image sensor described in patent reference 2 detects the focus state of an imaging lens based on images generated by pixel arrays having different directions of relative shift between microlenses and photo-electric conversion units. On the other hand, this sensor captures a normal image by adding pixels having different directions of relative shift between microlenses and photo-electric conversion units.

Also, the applicant of the present invention filed Japanese Patent Laid-Open No. 2005-106994 (to be referred to as "patent reference 3" hereinafter) that discloses a solid-state image sensor which performs focus detection of the pupil division scheme using a CMOS image sensor (solid-state image sensor) adopted in a digital still camera. The solid-state image sensor in patent reference 3 is configured such that some of a large number of pixels, which constitute the solid-state image sensor, each include a photo-electric conversion unit divided into two sections so as to detect the focus state of an imaging lens. The photo-electric conversion unit is configured to receive light in a predetermined area on the pupil of the imaging lens via the microlens.

FIG. 20 is an explanatory view of the distribution of light received by a pixel that performs focus detection and is located at the center of the solid-state image sensor disclosed in patent reference 3. FIG. 20 shows areas on the pupil of the imaging lens, in which the two divided photo-electric conversion units can respectively receive light. Crosshatched areas within a circle in FIG. 20 indicate the exit pupil of the imaging lens, and non-crosshatched areas $S\alpha$ and $S\beta$ indicate areas in which the two divided photo-electric conversion units can respectively receive light. The areas $S\alpha$ and $S\beta$ are normally set symmetric about the optical axis (the intersection between the x- and y-axes in FIG. 20) of the imaging lens.

The camera performs correlation calculation between an image generated by a light beam transmitted through the area $S\alpha$ on the pupil of the imaging lens and that generated by a light beam transmitted through the area $S\beta$ on that pupil, thereby detecting the focus state of the imaging lens. Japanese Patent Laid-Open No. 5-127074 (to be referred to as "patent reference 4" hereinafter) discloses a method of focus detection by correlation calculation between images generated by light beams transmitted through different pupil areas of the imaging lens. Patent reference 4 also discloses a technique of deforming a specific filter stored in the camera in accordance with the aperture ratio, the exit pupil position, and the amount of image shift, adapting the deformed filter to an object image, and detecting the image forming state.

The focus state can be detected not only for an object positioned at the center of the image capturing window but also for an object normally positioned in the periphery of the image capturing window. However, an eclipse of a light beam is often caused by, for example, the frame of the imaging lens in the periphery of the image capturing window. When this occurs, the areas $S\alpha$ and $S\beta$ on the pupil of the imaging lens become asymmetric. Therefore, an image generated by a light beam transmitted through the area $S\alpha$ on the pupil of the imaging lens has low degree of matching with that generated by a light beam transmitted through the area $S\beta$ on that pupil in that case. As a result, the techniques disclosed in patent references 1 to 3 have a disadvantage that high-accuracy focus detection is impossible even when correlation calculation is performed based on an image generated by a light beam transmitted through the area $S\alpha$ on the pupil of the imaging lens and an image generated by a light beam transmitted through the area $S\beta$ on that pupil.

Also, the technique disclosed in patent reference 4 has a disadvantage that image correction corresponding to an eclipse cannot be done solely by deforming a specific filter stored in the camera in accordance with the above-mentioned conditions.

SUMMARY OF INVENTION

The present invention has been made in consideration of the above-described problems, and more accurately performs focus detection in an image capturing apparatus.

According to the present invention, there is provided a focus detection apparatus comprising: photo-electric conversion means comprising a first pixel group which receives a light beam passing through a first pupil area of an image forming optical system that forms an image of an object, and a second pixel group which receives a light beam passing through a second pupil area of the image forming optical system; focus detection means for detecting a focus state of the image forming optical system based on a first object image generated by the first pixel group and a second object image generated by the second pixel group; a correction calculator for performing correction calculation for the first object image and the second object image based on the output from the focus detection means; and determination means for determining, based on the output from the focus detection means, whether to perform the correction calculation again.

Further features of the present invention will become apparent from the following description of exemplary embodiments with reference to the attached drawings.

BRIEF DESCRIPTION OF DRAWINGS

FIGS. 10A to 10C are schematic graphs representing the incident angle characteristics on focus detection pixels at the center of the image sensing element;

DESCRIPTION OF EMBODIMENTS

First Embodiment

Figure 1:
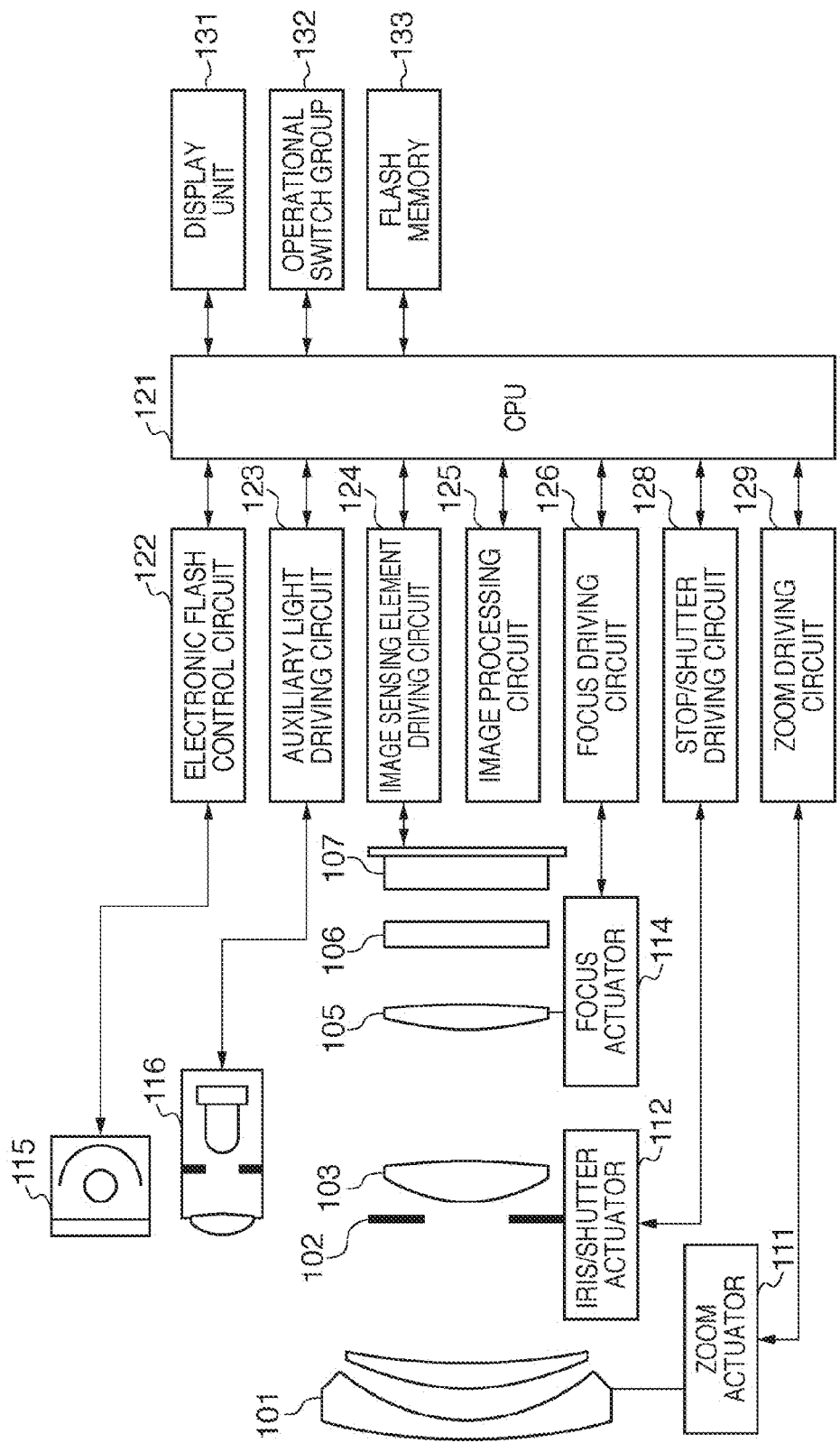
FIG. 1 is a block diagram showing the arrangement of a camera according to the first embodiment.

FIG. 1 is a block diagram showing the arrangement of a camera serving as an image capturing apparatus including a focus detection apparatus according to the first embodiment of the present invention. Referring to FIG. 1, reference numeral 101 denotes a first lens group located at the top of an imaging optical system (image forming optical system). The first lens group 101 is held to be retractable in the optical axis direction. Reference numeral 102 denotes a stop/shutter which not only adjusts the light amount during image capturing by adjusting its aperture size but also serves as an exposure time adjusting shutter during still image capturing. Reference numeral 103 denotes a second lens group. The stop/shutter 102 and second lens group 103 move forward/backward in the optical axis direction together, and interlock with the forward/backward moving operation of the first lens group 101 to provide a scaling function (zoom function). Reference numeral 105 denotes a third lens group which moves forward/backward in the optical axis direction to perform focus adjustment. Reference numeral 106 denotes an optical low-pass filter which serves as an optical element for reducing any false color and moiré in the captured image. Reference numeral 107 denotes an image sensing element which serves as a photo-electric conversion means and includes a C-MOS sensor and its peripheral circuits. The image sensing element 107 is a two-dimensional single-panel color sensor in which on-chip primary color mosaic filters are formed in a Bayer array on m (column)×n (row) light-receiving pixels.

Reference numeral 111 denotes a zoom actuator which drives the first lens group 101 to the third lens group 105 forward/backward in the optical axis direction by pivoting a cam cylinder (not shown) to perform a scaling operation. Reference numeral 112 denotes a stop/shutter actuator which controls the aperture size of the stop/shutter 102 to adjust the imaging light amount and controls the exposure time during still image capturing. Reference numeral 114 denotes a focus actuator which drives the third lens group 105 forward/backward in the optical axis direction to perform focus adjustment. Reference numeral 115 denotes an electronic flash for use in object illumination during image capturing. The electronic flash 115 is preferably a flash illumination device which employs a xenon tube, but may be an illumination device including an LED which continuously emits light. Reference numeral 116 denotes an AF auxiliary light emitter which projects an image of a mask having a predetermined opening pattern onto an object via a projection lens to improve focus detection capacity for a dark object or a low-contrast object.

Reference numeral 121 denotes a CPU which performs various types of control for the camera body and is built in the camera. The CPU 121 includes, for example, an arithmetic operation unit, ROM, RAM, A/D converter, D/A converter, and communication interface circuit. Based on a predetermined program stored in the ROM, the CPU 121 drives various kinds of circuits of the camera to perform a series of operations such as AF (autofocus), image capturing, image processing, and image recording. Reference numeral 122 denotes an electronic flash control circuit which controls the ON/OFF of the electronic flash 115 in synchronism with an image capturing operation. Reference numeral 123 denotes an auxiliary light driving circuit which controls the ON/OFF of the AF auxiliary light emitter 116 in synchronism with a focus detection operation. Reference numeral 124 denotes an image sensing element driving circuit which controls the image sensing operation of the image sensing element 107, A/D-converts the acquired image signal, and sends the converted signal to the CPU 121. Reference numeral 125 denotes an image processing circuit which performs processes such as γ conversion, color interpolation, and JPEG compression of the image acquired by the image sensing element 107.

Reference numeral 126 denotes a focus driving circuit which controls driving of the focus actuator 114 based on the focus detection result and drives the third lens group 105 forward/backward in the optical axis direction to perform focus adjustment. Reference numeral 128 denotes a stop/shutter driving circuit which controls driving of the stop/shutter actuator 112 to control the aperture of the stop/shutter 102. Reference numeral 129 denotes a zoom driving circuit which drives the zoom actuator 111 in accordance with the photographer's zoom operation. Reference numeral 131 denotes a display device such as an LCD, which displays, for example, information concerning the image capturing mode of the camera, a preview image before image capturing, a verification image after image capturing, and a focus state display image during focus detection. Reference numeral 132 denotes an operation switch group including, for example, a power supply switch, release (image capturing trigger) switch, zoom operation switch, and image capturing mode selection switch. Reference numeral 133 denotes a detachable flash memory which records a captured image.

Figure 2:
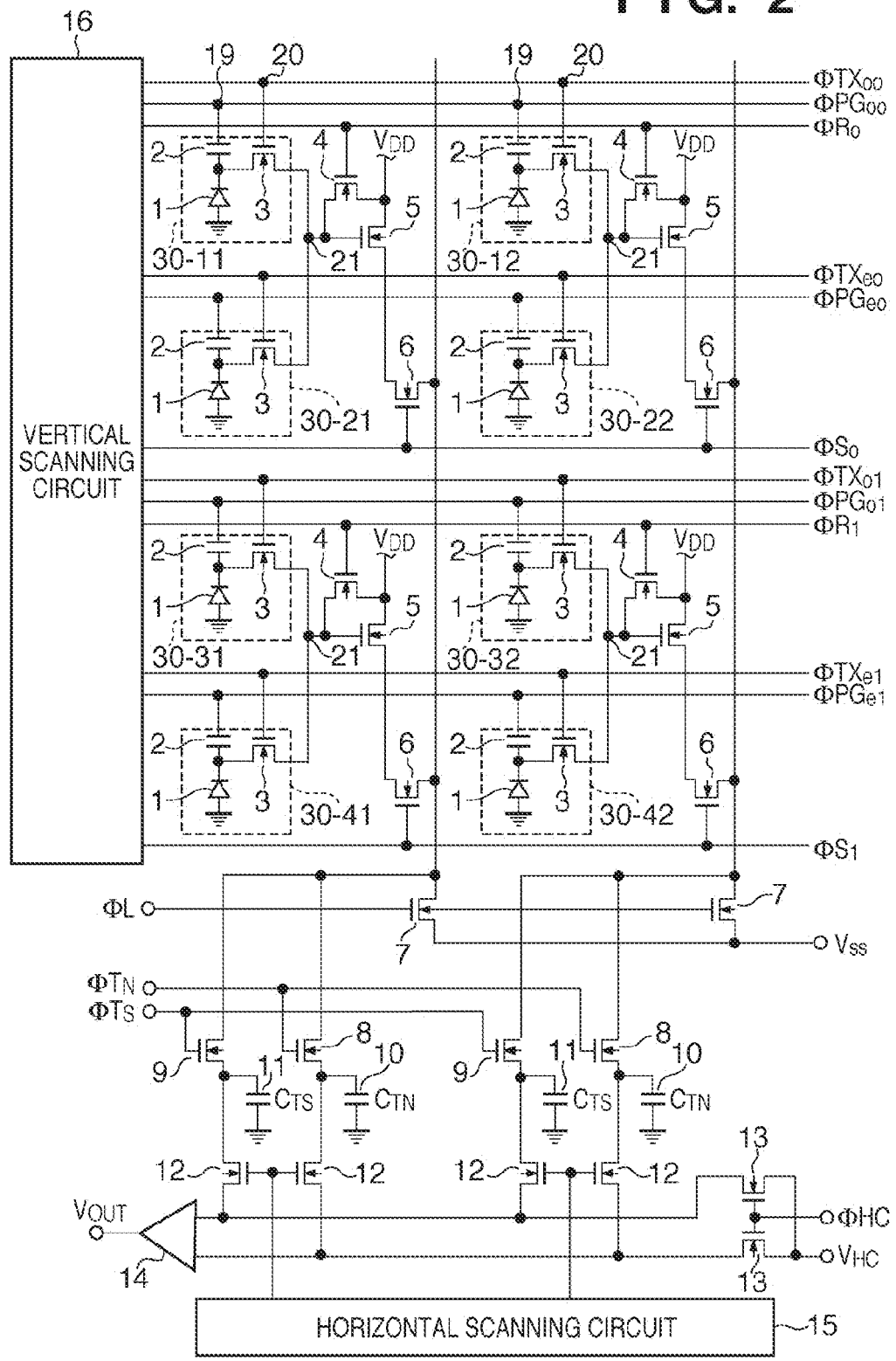
FIG. 2 is a circuit diagram showing the schematic circuit configuration of an image sensing element.

FIG. 2 is a circuit diagram showing the schematic circuit configuration of an image sensing element according to the first embodiment of the present invention, and its preferable example is a technique disclosed in Japanese Patent Laid-Open No. 09-046596 filed by the applicant of the present invention. FIG. 2 shows the range of 2×4 pixels in a two-dimensional C-MOS area sensor. However, when this sensor is used as an image sensing element, a high-resolution image can be acquired by arranging a large number of pixels, as shown in FIG. 2. This embodiment will be explained assuming that the image sensing element used has a pixel pitch of 2 μm, 3,000×2,000=6,000,000 effective pixels, and an image capturing window with a size of 6 mm (horizontal)×4 mm (vertical).

Referring to FIG. 2, reference numeral 1 denotes a photo-electric conversion unit of a photo-electric conversion element including a MOS transistor gate and a depletion layer below the gate; 2, a photo-gate; 3, a transfer switch MOS transistor; 4, a reset MOS transistor; and 5, a source follower amplifier MOS transistor. Reference numeral 6 denotes a horizontal selection switch MOS transistor; 7, a source follower load MOS transistor; 8, a dark output transfer MOS transistor; 9, a light output transfer MOS transistor; 10, a dark output storage capacitor $C_{TN}$; and 11, a light output storage capacitor $C_{TS}$. Reference numeral 12 denotes a horizontal transfer MOS transistor; 13, a horizontal output line reset MOS transistor; 14, a differential output amplifier; 15, a horizontal scanning circuit; and 16, a vertical scanning circuit.

Figure 3:
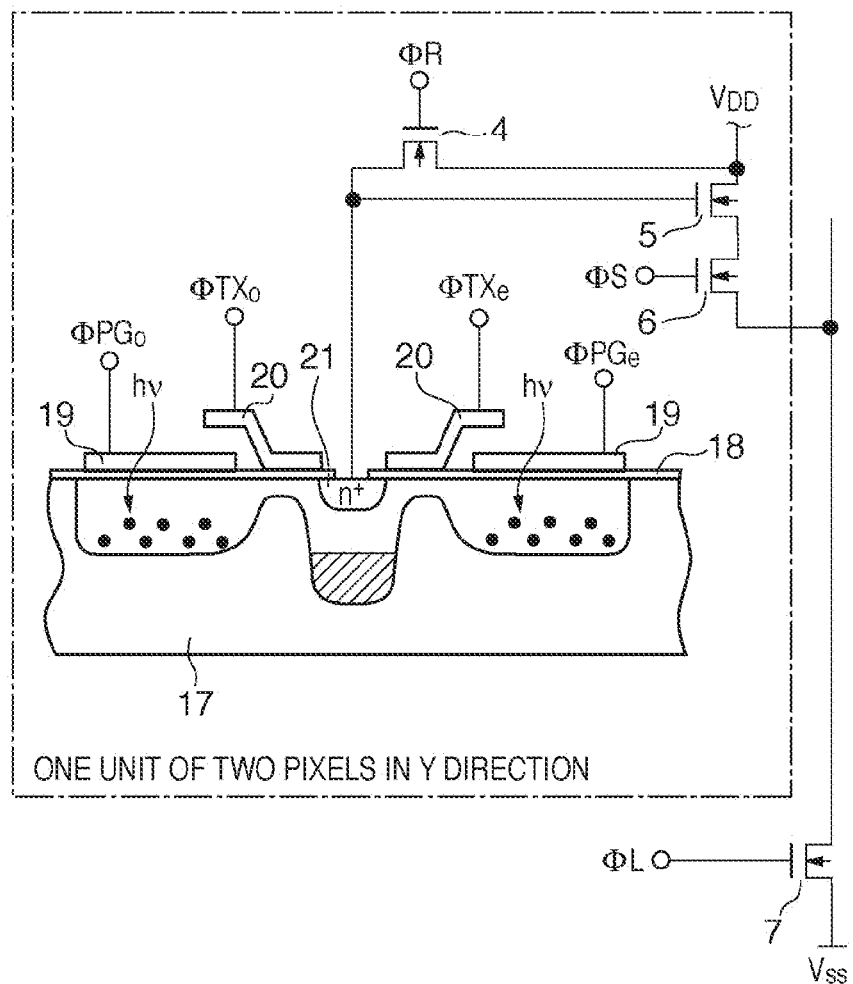
FIG. 3 is a sectional view showing the pixel portion of the image sensing element.

FIG. 3 is a sectional view showing the pixel portion of the image sensing element in this embodiment. Referring to FIG. 3, reference numeral 17 denotes a P-type well; 18, a gate oxide film; 19, a first polysilicon layer; 20, a second polysilicon layer; and 21, an $n^+$ floating diffusion portion (FD portion). The FD portion 21 is connected to another photo-electric conversion unit via another transfer MOS transistor. Although the drains of two transfer switch MOS transistors 3 share the FD portion 21 in FIG. 3 for miniaturization and an improvement in sensitivity by reducing the capacitance of the FD portion 21, FD portions 21 may be connected to each other by an A1 interconnection.

Figure 4:
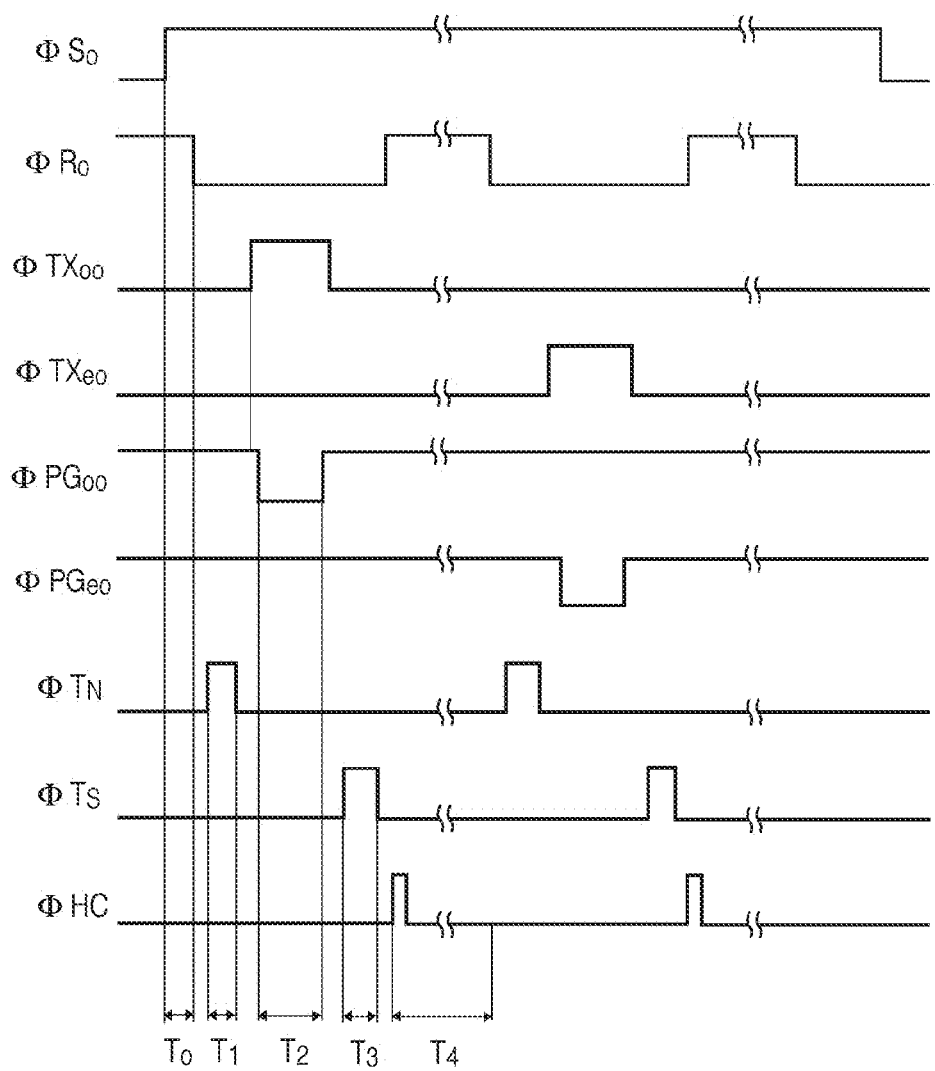
FIG. 4 is a timing chart showing the driving timing of the image sensing element.

The operation of the image sensing element will be explained next with reference to the timing chart shown in FIG. 4. This timing chart applies to a case in which independent output from all pixels is done. First, in response to a timing output from the vertical scanning circuit 16, a control pulse φL is set high to reset the vertical output lines. Also, control pulses $\phi R_0$, $\phi PG_{00}$, and $\phi PGe_0$ are set high to turn on the reset MOS transistor 4, and the first polysilicon layer 19 of the photo-gate 2 is set high. At time $T_0$, a control pulse $\phi S_0$ is set high to turn on the horizontal selection switch MOS transistor 6, and the pixel portions in the first and second lines are selected. Next, the control pulse $\phi R_0$ is changed to low to cancel the reset of the FD portion 21, so the FD portion 21 is set to a floating state, and the gate-to-source path of the source follower amplifier MOS transistor 5 is established. After that, at time $T_1$, a control pulse $\phi T_N$ is set high. The dark voltage of the FD portion 21 is output to the dark output storage capacitor $C_{TN}$ 10 by a source follower operation.

For photo-electric conversion output from pixels in the first line, a control pulse $\phi TX_{00}$ in the first line is set high to energize the transfer switch MOS transistor 3. After that, at time $T_2$, the control pulse $\phi PG_{00}$ is changed to low. At this time, a potential well extending below the photo-gate 2 is preferably raised to generate a voltage which acts to transfer all light-emitting carriers to the FD portion 21. For this reason, a fixed potential may be adopted instead of the control pulse φTX as long as all light-emitting carriers can be transferred.

As charges are transferred from the photo-electric conversion unit 1 of a photodiode to the FD portion 21 at time $T_2$, the potential of the FD portion 21 changes depending on the characteristics of the light. At this time, because the source follower amplifier MOS transistor 5 is in a floating state, a control pulse $\phi T_S$ is set high at time $T_3$ to output the potential of the FD portion 21 to the storage capacitor $C_{TS}$ 11. At this point, dark outputs and light outputs from the pixels in the first line are stored in the storage capacitors $C_{TN}$ 10 and $C_{TS}$ 11, respectively. At time $T_4$, a control pulse φHC is temporarily set high to energize the horizontal output line reset MOS transistor 13, so the horizontal output lines are reset. In the horizontal transfer duration, the dark outputs and light outputs from the pixels are transferred to the horizontal output line in accordance with a scanning timing signal from the horizontal scanning circuit 15. At this time, a signal which is free from any random noise and fixed pattern noise in pixels and therefore has a high S/N ratio can be obtained by generating a differential output $V_{OUT}$ between the storage capacitors $C_{TN}$ 10 and $C_{TS}$ 11 by the differential output amplifier 14. Photo-electric charges of pixels 30-12 and 30-22 are stored in the storage capacitors $C_{TN}$ 10 and $C_{TS}$ 11, respectively, simultaneously with the same operation in pixels 30-11 and 30-21. The photo-electric charges are read out to the horizontal output line by delaying timing pulses from the horizontal scanning circuit 15 by one pixel, and are output from the differential output amplifier 14. Although an arrangement in which the differential output $V_{OUT}$ is generated within a chip is shown in this embodiment, the same effect can be obtained even by externally using a conventional CDS (Correlated Double Sampling) circuit instead of generating the differential output $V_{OUT}$ within the chip.

After light outputs are transferred to the storage capacitor $C_{TS}$ 11, the control pulse $\phi R_0$ is changed to high to energize the reset MOS transistor 4, so the FD portion 21 is reset to a power supply $V_{DD}$. After the horizontal transfer in the first line is completed, the second line is read out. The second line is read out by driving control pulses $\phi TXe_0$ and $\phi PGe_0$ in the same way, supplying high control pulses $\phi T_N$ and $\phi T_S$, storing photo-electric charges in the storage capacitors $C_{TN}$ 10 and $C_{TS}$ 11, respectively, and extracting dark outputs and light outputs. The above-described driving allows independent readout of the first and second lines. After that, independent output from all pixels can be done by scanning the vertical scanning circuit and reading out the (2n+1)th and (2n+2)th lines (n=1, 2, . . . ). That is, when n=1, a control pulse $\phi S_1$ is set high, a control pulse $\phi R_1$ is set low, control pulses $\phi T_N$ and $\phi TX_{01}$ are set high, a control pulse $\phi PG_{01}$ is set low, a control pulse $\phi T_S$ is set high, and a control pulse φHC is temporarily set high, thereby reading out pixel signals from pixels 30-31 and 30-32. Subsequently, control pulses $\phi TXe_1$ and $\phi PGe_1$ and other control pulses are applied in the same way as above to read out pixel signals from pixels 30-41 and 30-42.

FIGS. 5A to 7B are views for explaining the structures of image sensing pixels and focus detection pixels. In this embodiment, a Bayer array in which, of 2×2=four pixels, two pixels with G (green) spectral sensitivity are arranged in two diagonal cells and two pixels respectively with R (red) and B (blue) spectral sensitivities are arranged in the remaining two cells is adopted. Focus detection pixels with a structure to be described later are distributed in the Bayer array in conformity with a predetermined rule.

Figure 5B:
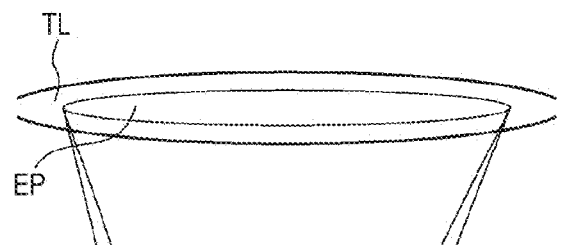
FIGS. 5A and 5B are a plan view and sectional view of image sensing pixels of the image sensing element.
Figure 5A:
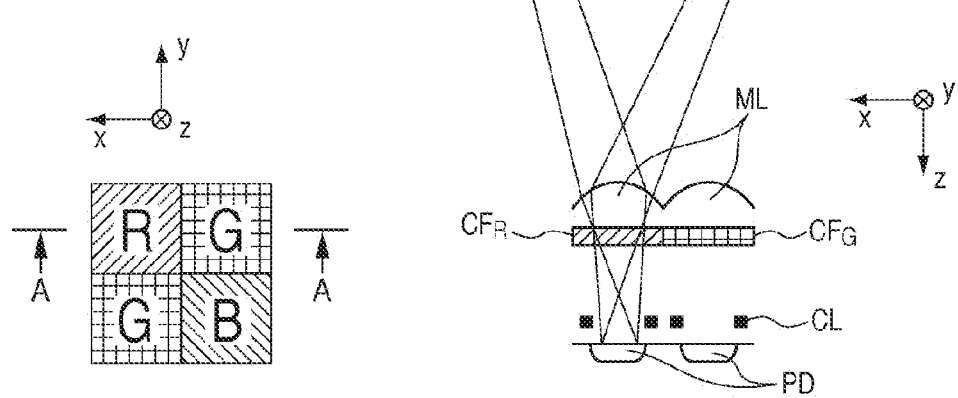

FIGS. 5A and 5B are a plan view and sectional view of image sensing pixels. FIG. 5A is a plan view showing 2×2 image sensing pixels located at the center of the image sensing element. As is known, in a Bayer array, two G pixels are arranged in two cells in the diagonal direction and two, R and B pixels are arranged in the remaining two cells. Such a structure of two rows×two columns is repeatedly arranged in the Bayer array. FIG. 5B shows a cross-section A-A in FIG. 5A. Reference symbol ML denotes an on-chip microlens located on the forefront face of each pixel; $CF_R$, an R (Red) color filter; and $CF_G$, a G (Green) color filter. Reference symbol PD denotes the schematic appearance of the photo-electric conversion unit of the C-MOS sensor explained with reference to FIG. 3; CL, an interconnection layer for forming signal lines which transfer various kinds of signals within the C-MOS sensor; and TL, the schematic appearance of the imaging optical system.

The on-chip microlens ML and photo-electric conversion unit PD of the image sensing pixel are configured to capture a light beam, having passed through the imaging optical system TL, effectively as much as possible. In other words, the photo-electric conversion unit PD and an exit pupil EP of the imaging optical system TL are set conjugate to each other by the microlens ML, and the photo-electric conversion unit is designed to have a large effective area. Although the incident light beam on the R pixel has been exemplified in FIG. 5B, the G pixel and B (Blue) pixel have the same structure. Hence, since the exit pupil EP corresponding to each of R, G, and B image sensing pixels has a large diameter, a light beam from an object is efficiently captured, thus improving the S/N ratio of an image signal.

Figure 6B:
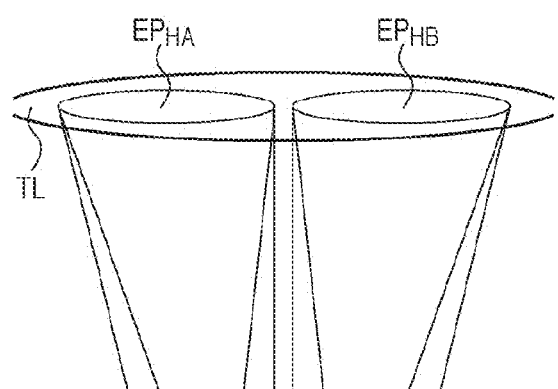
FIGS. 6A and 6B are a plan view and sectional view of focus detection pixels for pupil division of an imaging lens in the horizontal direction (lateral direction)
Figure 6A:
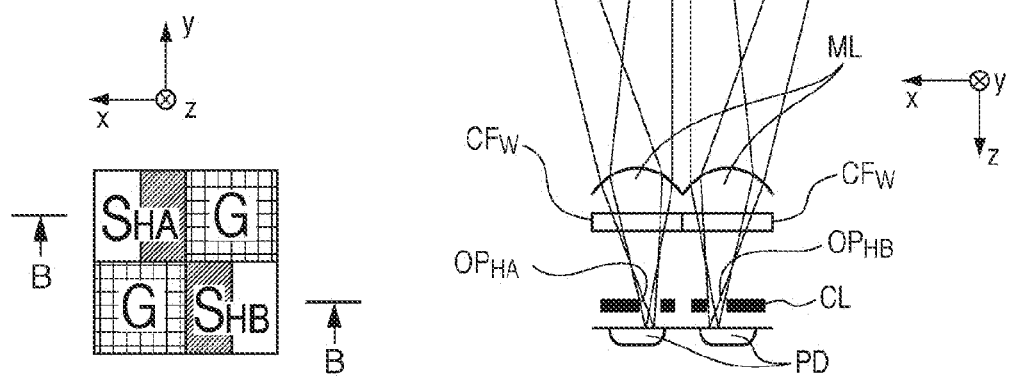

FIGS. 6A and 6B are a plan view and sectional view of focus detection pixels for pupil division of the imaging lens in the x direction in FIGS. 6A and 6B. FIG. 6A is a plan view showing 2×2 pixels including focus detection pixels located at the center of the image sensing element. When an image sensing signal is obtained, G pixels serve as the major components of luminance information. Humans are sensitive to luminance information as a characteristic of image recognition, so we are likely to recognize deterioration in image quality if a G pixel has a defect. In contrast, humans are insensitive to color information received by an R or B pixel, so we are less likely to recognize deterioration in image quality even if a pixel which receives color information has a little defect. Under the circumstance, in this embodiment, of 2×2 pixels, G pixels continue to serve as image sensing pixels, and focus detection pixels are arrayed at positions corresponding to R and B pixels at a certain ratio. Referring to FIG. 6A, reference symbols $S_{HA}$ and $S_{HB}$ denote these focus detection pixels.

FIG. 6B shows a cross-section B-B in FIG. 6A. A microlens ML and photo-electric conversion unit PD have the same structure as the image sensing pixel shown in FIG. 5B. In this embodiment, a signal from a focus detection pixel is not used for image formation, so a transparent film CFW (White) is adopted in place of a color filter for use in color separation. Also, the image sensing element performs pupil division, so the opening portion in an interconnection layer CL deviates in the x direction with respect to the central line of the microlens ML. More specifically, opening portions $OP_{HA}$ of pixels $S_{HA}$ (first pixel group) deviate in the −x direction, so they receive a light beam having passed through an exit pupil $EP_{HA}$ (first pupil area) of the imaging lens TL on the left side. Similarly, opening portions $OP_{HB}$ of pixels $S_{HB}$ (second pixel group) deviate in the +x direction, so they receive a light beam having passed through an exit pupil $EP_{HB}$ (second pupil area) of the imaging lens TL on the right side. Hence, the pixels $S_{HA}$ are regularly arrayed in the x direction and an object image acquired by the arrayed pixel group is defined as an image A (first object image), and the pixels $S_{HB}$ are also regularly arrayed in the x direction and an object image acquired by the arrayed pixel group is defined as an image B (second object image). Then, the amount of shift in focus (the amount of defocus and the focus state) of an object image can be detected by detecting the relative position between the images A and B.

The above-mentioned pixels $S_{HA}$ and $S_{HB}$ can detect the focus for an object with a luminance distribution in the x direction in the image capturing window, for example, a line in the y direction, but cannot detect the focus for a line in the x direction with a luminance distribution in the y direction. To overcome this, in this embodiment, pixels which perform pupil division of the imaging lens in the y direction are also used so as to detect the focus for even the latter line.

Figure 7B:
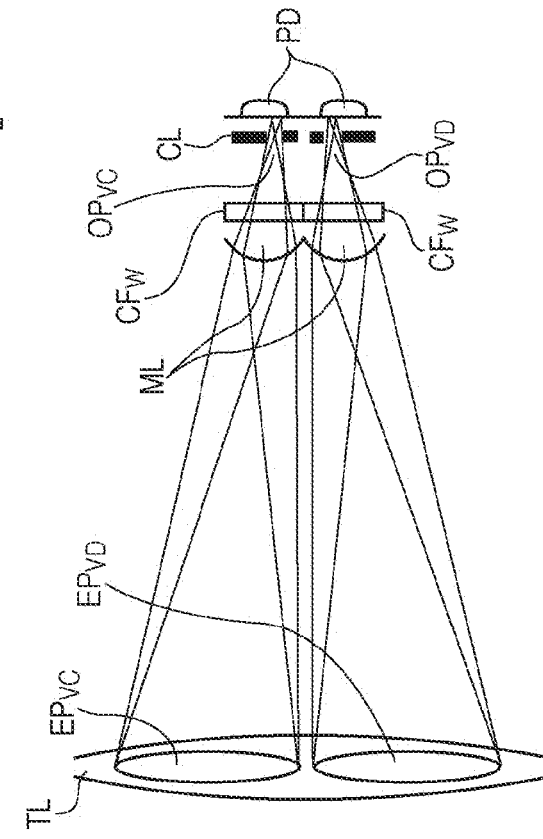
FIGS. 7A and 7B are a plan view and sectional view of focus detection pixels for pupil division of the imaging lens in the vertical direction (longitudinal direction)
Figure 7A:
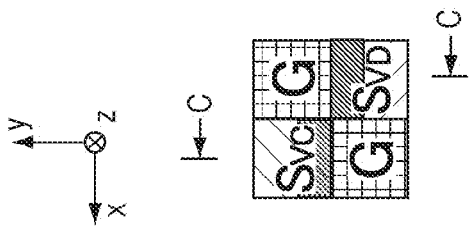

FIGS. 7A and 7B are a plan view and sectional view of focus detection pixels for pupil division of the imaging lens in the y direction of FIGS. 7A and 7B. FIG. 7A is a plan view showing 2×2 pixels including focus detection pixels located at the center of the image sensing element. G pixels continue to serve as image sensing pixels, and focus detection pixels are arrayed at positions corresponding to R and B pixels at a certain ratio, as in the case of FIG. 6A. Referring to FIG. 7A, reference symbols $S_{VC}$ and $S_{VD}$ denote these focus detection pixels.

FIG. 7B shows a cross-section C-C in FIG. 7A. The pixels shown in FIG. 7B have the same structure as those shown in FIG. 6B except that the former pixels perform pupil division in the y direction, whereas the latter pixels perform pupil division in the x direction. That is, opening portions $OP_{VC}$ of pixels $S_{VC}$ deviate in the −y direction, so they receive a light beam having passed through an exit pupil $EP_{VC}$ of the imaging lens TL in the +y direction. Similarly, opening portions $OP_{VD}$ of pixels $S_{VD}$ deviate in the +y direction, so they receive a light beam having passed through an exit pupil $EP_{VD}$ of the imaging lens TL in the −y direction. Hence, the pixels $S_{VC}$ are regularly arrayed in the y direction and an object image acquired by the arrayed pixel group is defined as an image C, and the pixels $S_{VD}$ are also regularly arrayed in the y direction and an object image acquired by the arrayed pixel group is defined as an image D. Then, the amount of shift in focus (amount of defocus) of an object image with a luminance distribution in the y direction can be detected by detecting the relative position between the images C and D.

Figure 8:
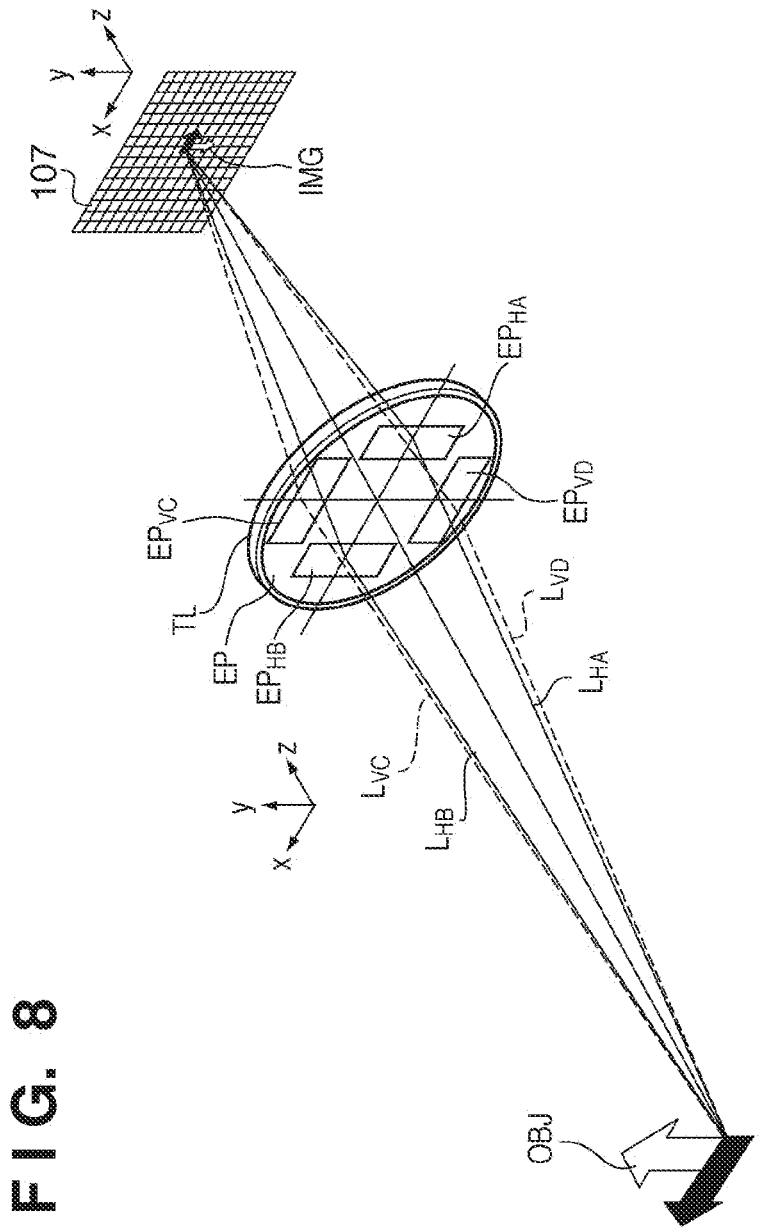
FIG. 8 is a view for conceptually explaining the pupil division condition of the image sensing element.

FIG. 8 is a view for conceptually explaining the pupil division state of the image sensing element in this embodiment. Reference symbol TL denotes the imaging lens; 107, the image sensing element; OBJ, an object; and IMG, an object image. The image sensing pixels receive a light beam having passed through the entire area on the exit pupil EP of the imaging lens, as has been explained with reference to the plane view and sectional view of the image sensing pixels in FIGS. 5A and 5B. On the other hand, the focus detection pixels have a pupil division function, as has been explained with reference to the plan view and sectional view of the focus detection pixels for pupil division in the x direction in FIGS. 6A and 6B, and those of the focus detection pixels for pupil division in the y direction in FIGS. 7A and 7B. More specifically, the pixels $S_{HA}$ shown in FIGS. 6A and 6B receive a light beam having passed through the pupil on the side of the +x direction, in other words, a light beam having passed through the exit pupil $EP_{HA}$ shown in FIG. 8. Similarly, the pixels $S_{HB}$, $S_{VC}$, and $S_{VD}$ receive light beams having passed through the exit pupils $EP_{HB}$, $EP_{VC}$, and $EP_{VD}$, respectively. Distributing focus detection pixels over the entire region on the image sensing element 107 allows focus detection over the entire image sensing region.

Figure 9:
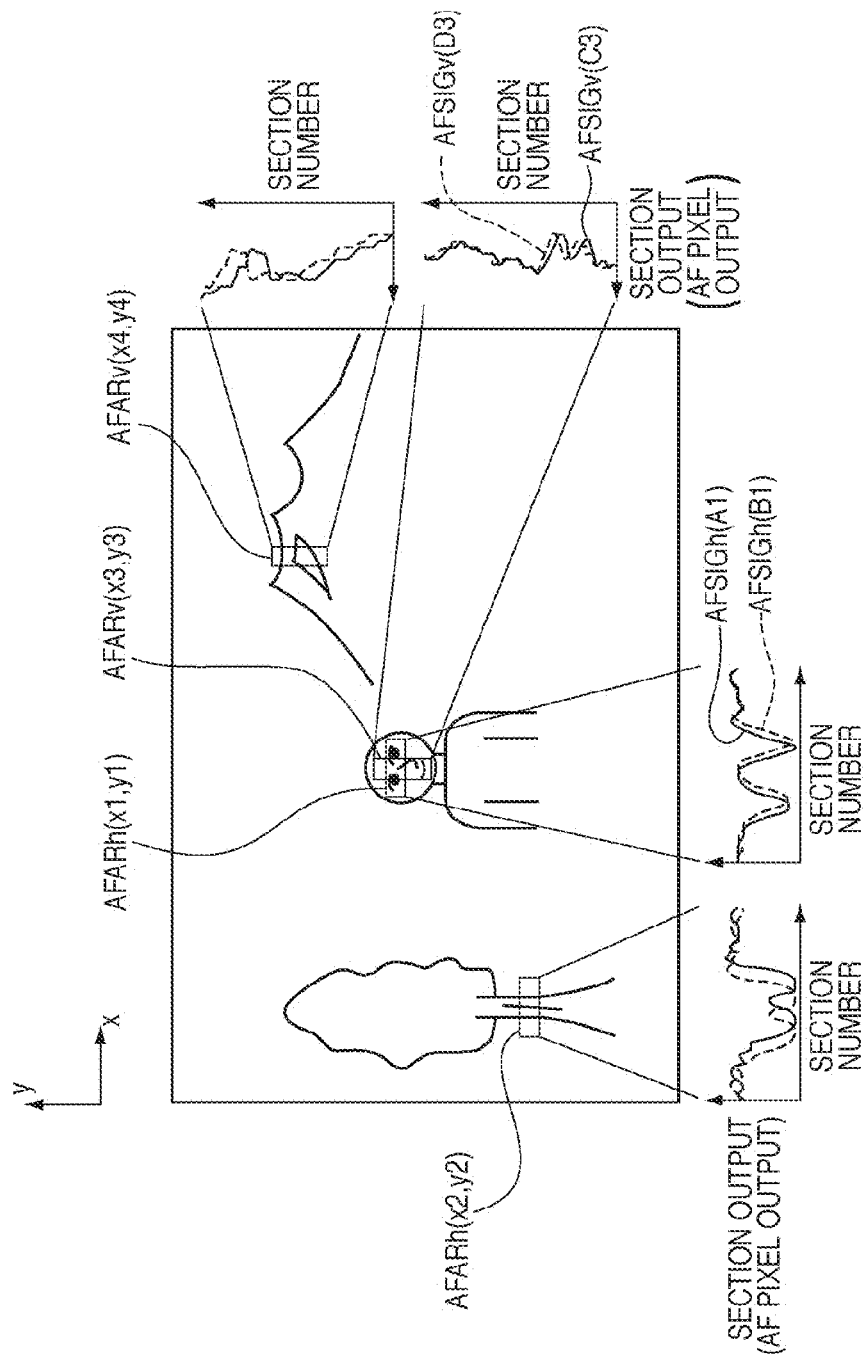
FIG. 9 is a view for explaining the image acquired upon focus detection and the focus detection area.

FIG. 9 is a view for explaining the image acquired upon focus detection and the focus detection area. Referring to FIG. 9, the object image formed on the image sensing plane records a person at the center, trees in the foreground on the left side, and a range of mountains in the background on the right side. In this embodiment, pairs of pixels $S_{HA}$ and $S_{HB}$ for use in shift detection in the x direction, and pairs of pixels $S_{VC}$ and $S_{VD}$ for use in shift detection in the y direction are arranged at a uniform density over the entire image sensing region as focus detection pixels. In shift detection in the x direction, a pair of image signals obtained from the pairs of pixels $S_{HA}$ and $S_{HB}$ for use in shift detection in the x direction are used as AF pixel signals for phase difference calculation. Also, in shift detection in the y direction, a pair of image signals obtained from the pairs of pixels $S_{VC}$ and $S_{VD}$ for use in shift detection in the y direction are used as AF pixel signals for phase difference calculation. This makes it possible to set distance measurement areas, for shift detection in both the x and y directions, at arbitrary positions in the image sensing region.

Referring to FIG. 9, the face of a person is present at the center of the window. Under the circumstance, when the presence of the face is detected by a known face recognition technique, a focus detection area AFARh(x1,y1) for shift detection in the x direction, and a focus detection area AFARv(x3,y3) for shift detection in the y direction are set assuming the face area as the center. Note that the suffix h represents the x direction, the suffix v represents the y direction, and (x1,y1) and (x3,y3) represent the coordinates at the upper left corners of the focus detection areas. Reference symbol AFSIGh(A1) denotes an image A signal which is used for phase difference detection and obtained by connecting, over 30 sections, the focus detection pixels $S_{HA}$ which are used for shift detection in the x direction and included in each section. Reference symbol AFSIGh(B1) denotes an image B signal which is used for phase difference detection and obtained by connecting, over 30 sections, the focus detection pixels $S_{HB}$ which are used for shift detection in the x direction and included in each section. An amount of shift in focus (amount of defocus) of the imaging lens can be obtained by calculating the relative amount of shift in the x direction between the image A signal AFSIGh(A1) and the image B signal AFSIGh(B1) by known correlation calculation. An amount of shift in focus in the focus detection area AFARv(x3,y3) is obtained in the same way. It is only necessary to compare the two amounts of shift in focus detected in the focus detection areas for shifts in both the x and y directions, and to adopt a value with higher reliability.

In contrast, the trunk of the tree on the left side of the window has a major component in the y direction, in other words, has a luminance distribution in the x direction, and is therefore determined as an object suitable for shift detection in the x direction. A focus detection area AFARh(x2,y2) for shift detection in the x direction is set for this object. Also, the ridge line of the range of mountains has a major component in the x direction, in other words, has a luminance distribution in the y direction, and is therefore determined as an object suitable for shift detection in the y direction. A focus detection area AFARv(x4,y4) for shift detection in the y direction is set for this object.

As described above, in this embodiment, focus detection areas for shift detection in both the x and y directions can be set at arbitrary positions in the window. This makes it possible to always perform focus detection irrespective of the projection position of an object and the directionality of the luminance distribution. Note that since the principles of shift detection in the x and y directions are the same except for the direction, only shift detection in the x direction will be described below and shift detection in the y direction will not be described.

FIGS. 10A to 10C are schematic graphs representing the incident angle characteristics on focus detection pixels at the center of the image sensing element. FIG. 10A shows the characteristic in a pixel $S_{HA}$, and FIG. 10B shows the characteristic in a pixel $S_{HB}$. The x- and y-axes in FIGS. 10A and 10B indicate the incident angles of the pixels in the x and y directions, respectively. Referring to FIGS. 10A to 10C, a darker color indicates a higher intensity of received light. The exit pupil of the pixel $S_{HA}$ and that of the pixel $S_{HB}$ are separately denoted by reference symbols $EP_{HA}$ and $EP_{HB}$ in FIGS. 6A and 6B for the sake of easy explanation. However, as shown in FIGS. 10A to 10C, the exit pupils of the pixels $S_{HA}$ and $S_{HB}$ have a partially overlapping area in order to improve the S/N ratio or due to the influence of diffraction by the opening portions $OP_{HA}$ and $OP_{HB}$ in practice. FIG. 10C is a graph representing the one-dimensional incident angle characteristics on the focus detection pixels. In FIG. 10C, the abscissa indicates the incident angle, the ordinate indicates the sum of the light-receiving sensitivities in the θy direction in FIGS. 10A and 10B, and the origin indicates the optical axis. As shown in FIG. 10C, the incident angle characteristics on the pixels $S_{HA}$ and $S_{HB}$ serving as focus detection pixels at the center of the image sensing element are nearly symmetric about the optical axis.

Figure 11A:
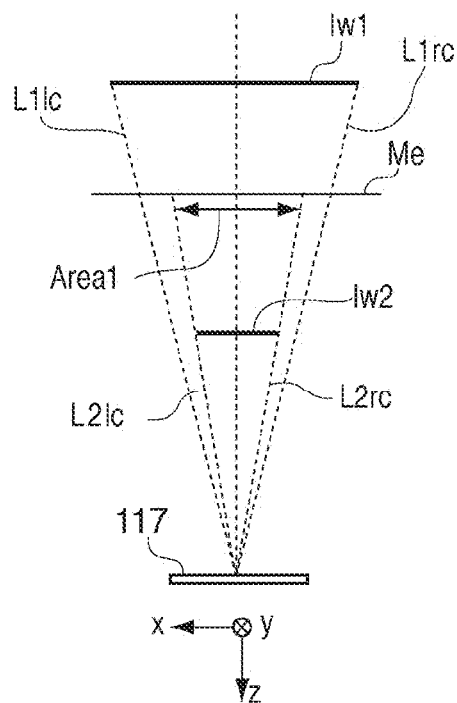
FIGS. 11A and 11B are diagrams for explaining eclipses of light beams.
Figure 11B:
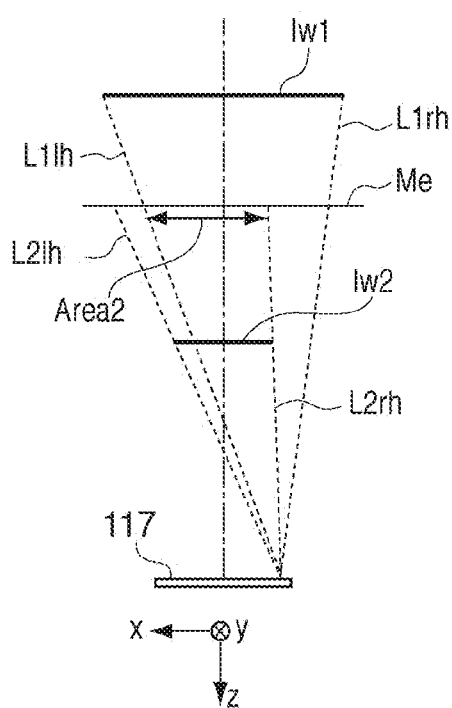

FIGS. 11A and 11B are diagrams for explaining eclipses of light beams. FIG. 11A shows a light beam which enters a pixel at the center of the image sensing element, and FIG. 11B shows a light beam which enters a pixel at a position with a given image height from the center of the image sensing element. The image sensing element receives a light beam limited by some constituent members such as the lens holding frame of the imaging lens and the stop/shutter 102. The following description assumes that two members limit a light beam at all image heights for the sake of easy explanation. Reference symbols Iw1 and Iw2 denote windows serving as members which limit a light beam, and the light beam passes through these windows Iw1 and Iw2. Reference symbol Me denotes a pupil plane set by the arrangement of the microlens ML.

An eclipse of a light beam which enters a pixel at the center of the image sensing element will be explained with reference to FIG. 11A. Reference symbols L1rc and L1lc denote the outer peripheral portions of a light beam emerging from the window Iw1, in which reference symbol L1rc corresponds to the right end in FIG. 11A, and reference symbol L1lc corresponds to the left end in FIG. 11A. Reference symbols L2rc and L2lc denote the outer peripheral portions of a light beam which emerges from the window Iw2 and is projected to the pupil position of the microlens ML, in which reference symbol L2rc corresponds to the right end in FIG. 11A, and reference symbol L2lc corresponds to the left end in FIG. 11A. As shown in FIG. 11A, the pupil area on the pupil plane Me of a light beam which enters a pixel at the center of the image sensing element corresponds to a light beam having the outer peripheral portions L2lc and L2rc, in other words, is indicated by a two-headed arrow Area1.

An eclipse of a light beam which enters a pixel at a position with a given image height from the center of the image sensing element will be explained with reference to FIG. 11B next. Reference symbols L1rh and L1lh denote the outer peripheral portions of a light beam emerging from the window Iw1, in which reference symbol L1rh corresponds to the right end in FIG. 11B, and reference symbol L1lh corresponds to the left end in FIG. 11B. Reference symbols L2rh and L2lh denote the outer peripheral portions of a light beam which emerges from the window Iw2 and is projected to the pupil position of the microlens ML, in which reference symbol L2*rh* corresponds to the right end in FIG. 11B, and reference symbol L2*lh* corresponds to the left end in FIG. 11B. As shown in FIG. 11B, the pupil area on the pupil plane Me of a light beam which enters a pixel at a position with a given image height from the center of the image sensing element corresponds to a light beam having the outer peripheral portions L1*lh* and L2*rh*, in other words, is indicated by a two-headed arrow Area2.

Figure 12A:
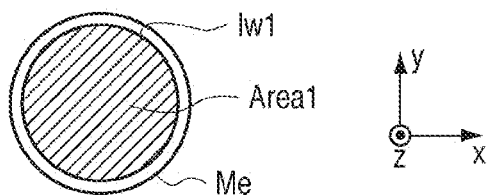
FIGS. 12A and 12B are views showing the pupil areas on pupil planes Me.
Figure 12B:
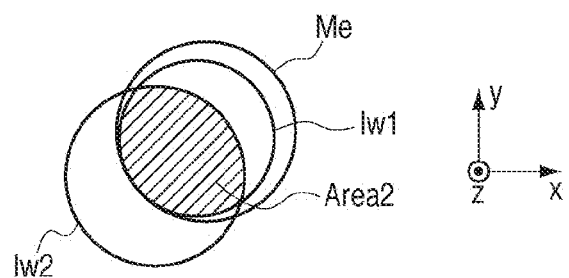

FIGS. 12A and 12B are views showing the pupil areas on pupil planes Me. FIG. 12A shows the pupil area of a pixel at the center of the image sensing element, and FIG. 12B shows the pupil area of a pixel at a position with a given image height from the center of the image sensing element. As has been explained with reference to FIGS. 11A and 11B, a pixel at the center of the image sensing element receives a light beam limited only by the single window Iw2, so the shape of the window Iw2 is directly projected to a pupil area Area1, as shown in FIG. 12A. Because a window which limits a light beam has a circular shape, the pupil area Area1, in turn, has a circular shape. In contrast, a pixel at a position with a given image height from the center of the image sensing element receives a light beam limited by both the windows Iw1 and Iw2, so the pupil area Area2 has the shape as shown in FIG. 12B.

Figure 13A:
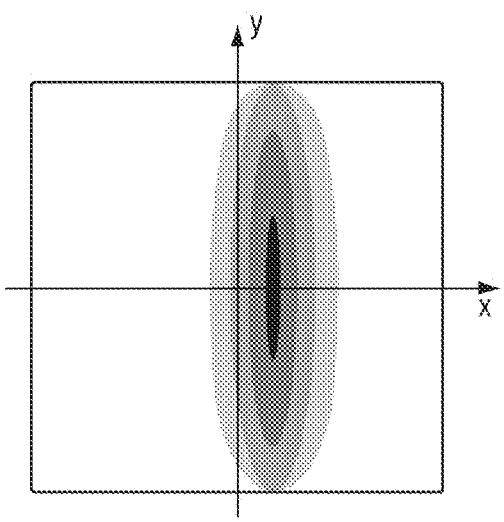
FIGS. 13A and 13B are graphs showing the pupil intensity distributions in the focus detection pixels.
Figure 13B:
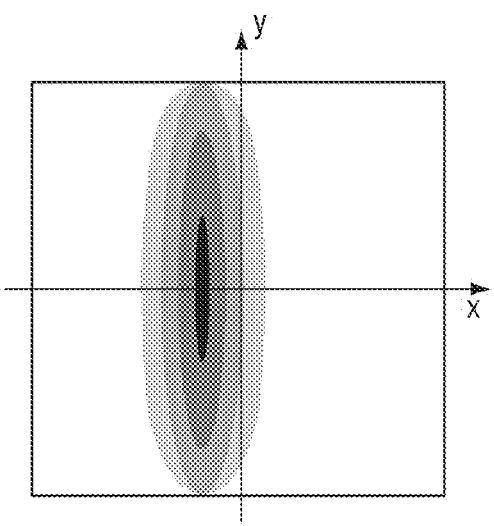

FIGS. 13A and 13B are graphs showing the pupil intensity distributions in the focus detection pixels. These pupil intensity distributions are equivalent to the distributions obtained by projecting the incident angle characteristics on the focus detection pixels at the center of the image sensing element shown in FIGS. 10A to 10C onto the pupil of the microlens ML. The ordinate and abscissa in FIGS. 13A and 13B indicate the coordinates on the pupil. These pupil intensity distributions have the same characteristics even in pixels at positions with given image heights from the center of the image sensing element. This is because the microlens ML in a pixel at a position with a given image height from the center of the image sensing element is fabricated to be decentered such that the center of the optical axis passes through the center of the pupil of the microlens ML.

Figure 14A:
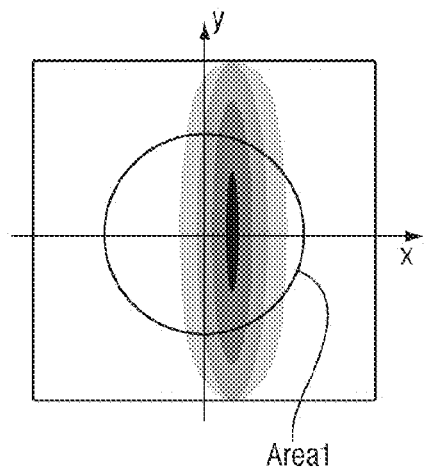
FIGS. 14A to 14C are graphs showing eclipses on the pupil planes Me of focus detection pixels at the center of the image sensing element.
Figure 14B:
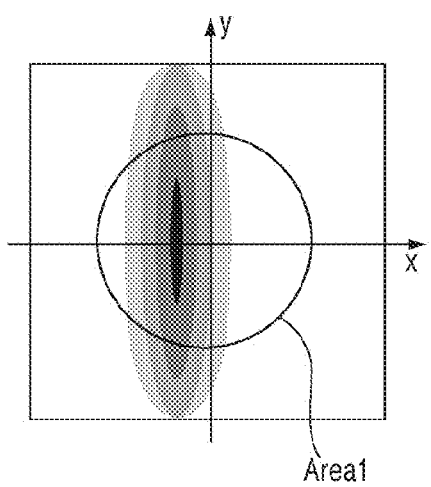
Figure 14C:
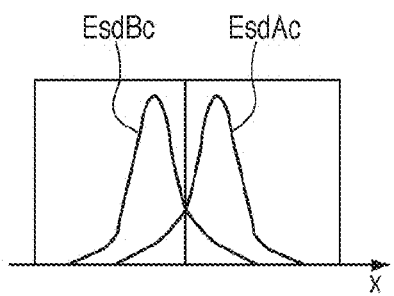

FIGS. 14A to 14C are graphs showing eclipses on the pupil planes Me of focus detection pixels at the center of the image sensing element. FIG. 14A shows the characteristic in the pixel $S_{HA}$, and FIG. 14B shows the characteristic in the pixel $S_{HB}$. FIGS. 14A to 14C are views obtained by superposing the view shown in FIG. 12A and those shown in FIGS. 13A and 13B on each other. Light beams transmitted within the shapes indicated by reference symbols Area1 enter the pixels $S_{HA}$ and $S_{HB}$ with the pupil intensity distributions shown in FIGS. 14A to 14C. FIG. 14C is a graph representing the two-dimensional pupil intensity distributions of the incident light beams on the pupil planes Me of the focus detection pixels at the center of the image sensing element. In FIG. 14C, the abscissa indicates the coordinate in the x direction on the pupil plane Me, and the ordinate indicates the intensity at each coordinate. The intensity at each coordinate is the sum of the pupil intensities in the y direction in FIGS. 14A and 14B. Reference symbols EsdAc and EsdBc denote the pupil intensity distributions of the incident light beams on the pupil planes Me of the pixels $S_{HA}$ and $S_{HB}$. As shown in FIG. 14C, the pupil intensity distributions on the pupil planes Me of the pixels $S_{HA}$ and $S_{HB}$ are bilaterally symmetric. Because eclipsed shapes are also bilaterally symmetric, the pupil intensity distributions EsdAc and EsdBc of the incident light beams on the pupil planes Me of the pixels $S_{HA}$ and $S_{HB}$, in turn, are bilaterally symmetric.

Figure 15A:
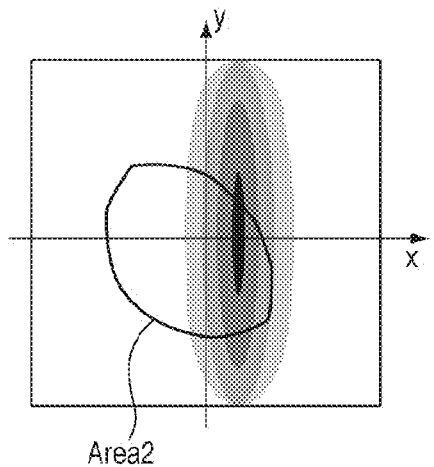
FIGS. 15A to 15C are graphs showing eclipses on the pupil planes Me of pixels at positions with given image heights from the center of the image sensing element.
Figure 15B:
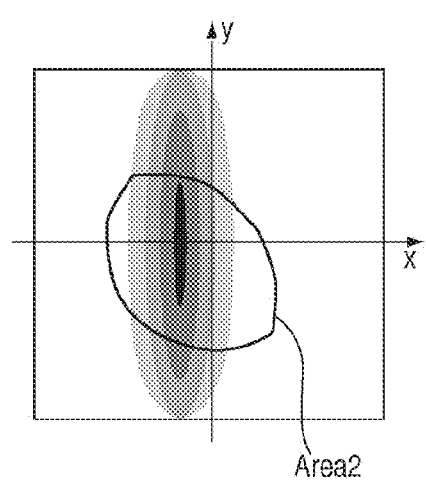
Figure 15C:
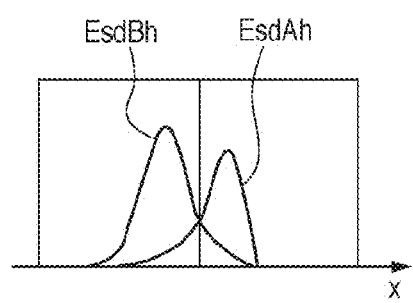

FIGS. 15A to 15C are graphs showing eclipses on the pupil planes Me of pixels at positions with given image heights from the center of the image sensing element. FIG. 15A shows the characteristic in the pixel $S_{HA}$, and FIG. 15B shows the characteristic in the pixel $S_{HB}$. FIGS. 15A to 15C are views obtained by superposing the view shown in FIG. 12B and those shown in FIGS. 13A and 13B on each other. Light beams transmitted within the shapes indicated by reference symbols Area2 enter the pixels $S_{HA}$ and $S_{HB}$ with the pupil intensity distributions shown in FIGS. 15A to 15C. FIG. 15C is a graph representing the two-dimensional pupil intensity distributions of the incident light beams on the pupil planes Me of the focus detection pixels at positions with given image heights from the center of the image sensing element. In FIG. 15C, the abscissa indicates the coordinate in the x direction on the pupil plane Me, and the ordinate indicates the intensity at each coordinate. The intensity at each coordinate is the sum of the pupil intensities in the y direction in FIGS. 15A and 15B. Referring to FIG. 15C, reference symbols EsdAh and EsdBh denote the pupil intensity distributions of the incident light beams on the pupil planes Me of the pixels $S_{HA}$ and $S_{HB}$. The pupil intensity distributions on the pupil planes Me of the pixels $S_{HA}$ and $S_{HB}$ are bilaterally symmetric. However, because eclipsed shapes are bilaterally asymmetric, the pupil intensity distributions EsdAh and EsdBh of the incident light beams on the pupil planes Me of the pixels $S_{HA}$ and $S_{HB}$, in turn, are bilaterally asymmetric.

As described previously, the amount of shift in focus (amount of defocus) of an object image is detected by detecting the relative position between an object image A acquired by the pixel group in which the pixels $S_{HA}$ are regularly arrayed in the x direction, and an object image B acquired by the pixel group in which the pixels $S_{HB}$ are regularly arrayed in the x direction.

Letting f(x,y) be the light amount distribution of an object, and g(x,y) be the light amount distribution of an object image, a relation (convolution integral):

$$g(x, y) = \int_{-\infty}^{\infty}\int_{-\infty}^{\infty} f(x-a, y-b)h(a, b)dadb \qquad (1)$$

holds, where h(x,y) is a transfer function describing the state in which the object deteriorates in an image forming system, and is called a point spread function. Therefore, we need to know a point spread function to determine a pair of object images for use in focus detection. In focus detection of the phase difference scheme, since a phase shift of a pair of object images in a one-dimensional direction is detected, an image system associated with focus detection can be evaluated using a line spread function serving as a one-dimensional function, in place of a point spread function. In view of this, when the light amount distribution of the object is substituted by f(x), and the light amount distribution of the object image is substituted by g(x), equation (1) can be rewritten as:

$$g(x) = \int_{-\infty}^{\infty} f(x-a)L(a)da \qquad (2)$$

where L(a) is the line spread function.

As can be seen from equation (2), a pair of object images can be determined by learning a pair of line spread functions generated by light beams which pass through different pupil areas in phase shift direction upon arbitrary defocusing. When a pair of object images are determined, it is possible to obtain a base length from the distance between the centroids of the respective object images and, in turn, to calculate an amount of defocus from the base length and the amount of shift between the pair of object images. A base length can be obtained by:

$$G_A = \frac{\int_{-\infty}^{\infty} x \cdot L_A(x) dx}{\int_{-\infty}^{\infty} L_A(x) dx} \quad (3)$$

$$G_B = \frac{\int_{-\infty}^{\infty} x \cdot L_B(x) dx}{\int_{-\infty}^{\infty} L_B(x) dx} \quad (4)$$

$$\text{Base Length } G = |G_A - G_B| \quad (5)$$

where $G_A$ and $G_B$ are the centroids of the object images, and G is the base length.

Figure 16A:
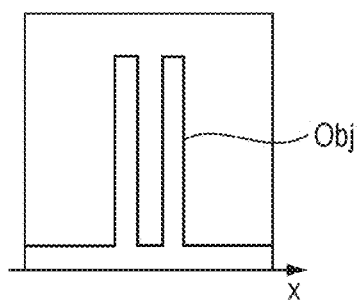
FIGS. 16A to 16G are conceptual graphs for explaining filter processing to cancel asymmetry of an object image.
Figure 16B:
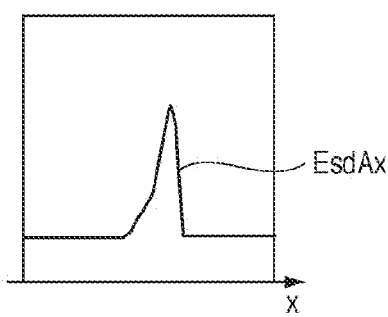
Figure 16C:
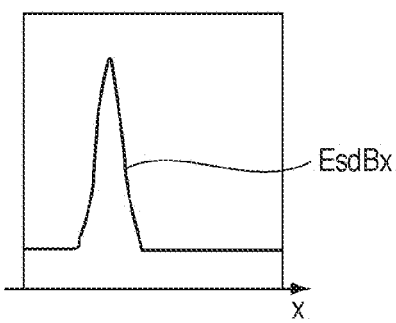
Figure 16D:
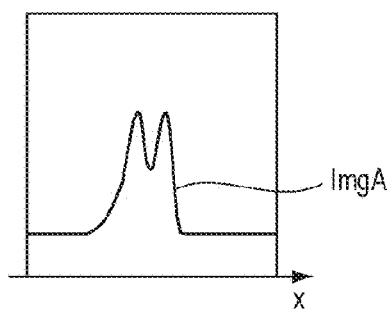
Figure 16E:
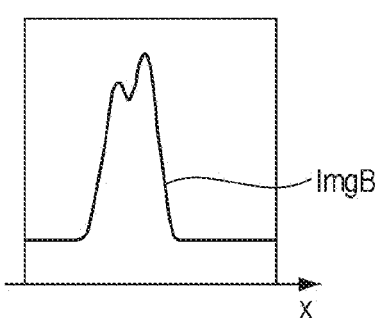
Figure 16F:
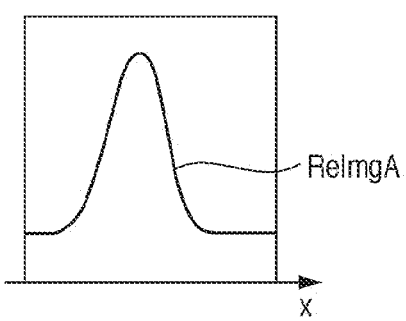
Figure 16G:
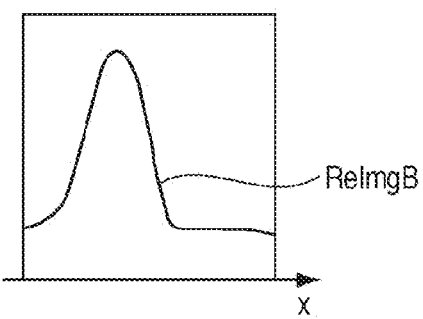

A method of correcting asymmetry between the object images by correction calculation will be explained next. As described previously, asymmetry between the object images A and B occurs upon convolution integration of asymmetric pupil intensity distributions in the pixels $S_{HA}$ and $S_{HB}$. FIGS. 16A to 16G are conceptual graphs for explaining filter processing to cancel asymmetry between the object images. In FIGS. 16A to 16G, the abscissa indicates the coordinate in the x direction within the focus detection filed, and the ordinate indicates the luminance. Reference symbol Obj in FIG. 16A denotes the light amount distribution of the object, and reference symbols EsdAx and EsdBx in FIGS. 16B and 16C denote line images on the AF pupils of the pixels $S_{HA}$ and $S_{HB}$. FIGS. 16D and 16E respectively show an object image A denoted by reference symbol ImgA (first image signal) and an object image B denoted by reference symbol ImgB (second image signal) upon given defocusing. The object image A ImgA and the object image B ImgB are obtained by respectively performing convolution integration of the line image EsdAx (first line image) and the line image EsdBx (second line image) into the light amount distributions Obj of the object. FIGS. 16F and 16G show a corrected image ReImgA obtained by convolution integration of the line image EsdBx of the image B into the object image A ImgA, and a corrected image ReImgB obtained by convolution integration of the line image EsdAx of the image A into the object image B ImgB. The respective corrected images have the same shape, as shown in FIGS. 16F and 16G. The principle in which the corrected images have the same shape will be explained.

The object image A ImgA is obtained by the following equation described earlier:

$$g(x) = \int_{-\infty}^{\infty} f(x-a) L(a) da \quad (2)$$

A function k(x) describing the corrected image ReImgA obtained by convolution integration of the object image A ImgA into the line image EsdBx is calculated by:

$$k(x) = \int_{-\infty}^{\infty} g(x-b) L_B(b) db \quad (6)$$

$$= \int_{-\infty}^{\infty} \int_{-\infty}^{\infty} f(x-a-b) L_A(a) da L_B(b) db$$

$$= \int_{-\infty}^{\infty} \int_{-\infty}^{\infty} f(x-a-b) L_A(a) L_B(b) da db$$

When a function k(x) describing the corrected image ReImgB is similarly calculated, we have:

$$k(x) = \int_{-\infty}^{\infty} \int_{-\infty}^{\infty} f(x-a-b) L_A(a) L_B(b) da db \quad (7)$$

As can be seen from the equations (6) and (7) described earlier, the obtained corrected images ReImgA and ReImgB are the same.

A focus detection operation in this embodiment will be explained next with reference to a flowchart shown in FIG. 17. Note that the CPU 121 performs the operation in the sequence shown in FIG. 17. In step S1, N indicating the number of times of a defocus amount calculation process is substituted by 0, and the process advances to step S2. In step S2, lens information to determine an eclipse state is read out, and the process advances to step S3. In step S3, distance measurement point information such as the distance measurement positions and ranges set by the user is read out. After step S3 is completed, the process advances to step S4. In step S4, image signals from focus detection pixels at the distance measurement positions read out in step S3 are read out to form object images A and B. After step S4 is completed, the process advances to step S5. In step S5, the CPU 121 obtains an amount of image shift by a known correlation calculation method using the object images A and B obtained in step S4, and obtains a tentative amount of defocus taken together with the lens information obtained in step S2. After a tentative amount of defocus is calculated, the process advances to step S6.

In step S6, N indicating the number of times of a defocus amount calculation process is incremented by 1, and the process advances to step S7. In step S7, the CPU 121 performs eclipse correction of the object images A and B, obtained in step S4, using the latest value of the repeatedly calculated amount of defocus. After step S7 is completed, the process advances to step S8. A detailed process associated with the eclipse correction in step S7 will be described later. In step S8, using the object images after the eclipse correction, which are formed in step S7, the CPU 121 calculates an amount of shift between the two images by a known correlation calculation method. An amount of defocus is obtained taken together with the base length calculated in step S7. After step S8 is completed, the process advances to step S9.

In step S9, N indicating the number of times of a defocus amount calculation process is incremented by 1, and the process advances to step S10. In step S10, the CPU 121 performs eclipse correction again and determines whether to recalculate an amount of defocus. More specifically, if the value of (DEF(N-1))–(DEF(N-2)) is equal to or smaller than a predetermined convergence determination threshold, a determination means (CPU 121) does not repeatedly calculate an amount of defocus again because the calculated amount of defocus has already satisfactorily converged in this case. If that value is larger than the predetermined convergence determination threshold, the determination means determines that it is necessary to recalculate eclipse correction parameters using the calculated latest amount of defocus to recalculate an amount of defocus because the calculated amount of defocus has not yet satisfactorily converged in this case. If YES in step S10, the process returns to step S7. If NO in step S10, the process advances to step S11.

In step S11, it is determined whether the calculated latest amount of defocus (DEF(N-1)) indicates an in-focus state. If NO in step S11, the process advances to step S12. If YES in step S11, the process advances to step S13. In step S12, the third lens group 105 is moved forward/backward in accordance with the defocus calculation result. Then, the process returns to step S4. In step S13, a series of steps of the focus detection sequence ends.

The "Eclipse Correction Process Corresponding to Amount of Defocus (DEF(N-1))" in step S7 in the flowchart of the focus detection operation shown in FIG. 17 will be explained next. In this case, the CPU 121 performs shading correction for adjusting the light amount ratio between the images A and B using the latest amount of defocus calculated in step S5 or S8, performs shape correction of the images A and B so that they have nearly the same shape, and calculates a base length. This process will be explained in detail below with reference to the flowchart shown in FIG. 18.

In step S101, shadings of the object images A and B are estimated from the lens information, the distance measurement point information, and the latest defocus information (DEF(N-1)), and performs shading correction for adjusting the light amount ratio between the images A and B. After the shading correction, the process advances to step S102. In step S102, a pupil intensity distribution stored in the ROM within the CPU 121 is read out in each focus detection pixel, and line spread functions are calculated taken together with the lens information, the distance measurement point information, and the latest defocus information (DEF(N-1)). After step S102 is completed, the process advances to step S103. In step S103, the CPU 121 creates image correction filters. The line spread functions obtained in step S102 are adapted to the widths of the image correction filters determined based on the latest defocus information (DEF(N-1)). Details of this process will be described later. After step S103 is completed, the process advances to step S104.

In step S104, convolution integration of the image correction filters obtained in step S103 into the object images A and B is performed to calculate corrected object images obtained by adjusting the images A and B to have nearly the same shape. Then, the process advances to step S105. In step S105, a base length is calculated using the line spread functions obtained in step S102. A method of calculating a base length will be described later. After step S105 is completed, the process advances to step S106. In step S106, a series of steps of the focus detection sequence ends.

Figure 19A:
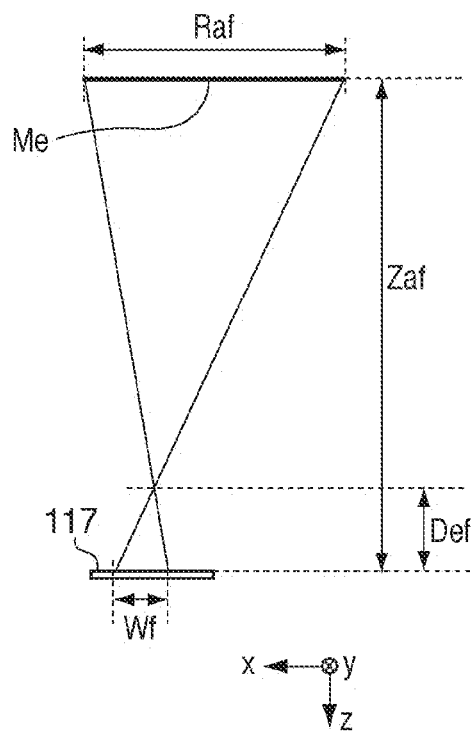
FIGS. 19A and 19B are diagrams representing light beams which strike the image sensing element.
Figure 19B:
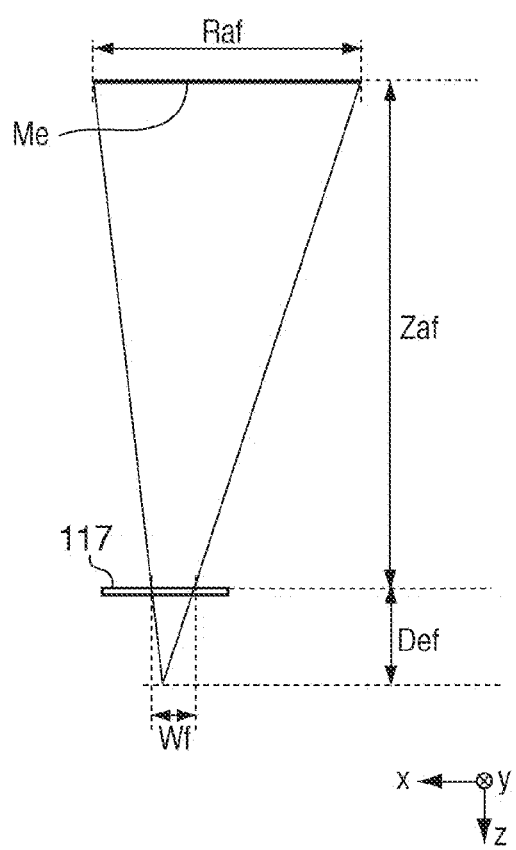
Figure 20:
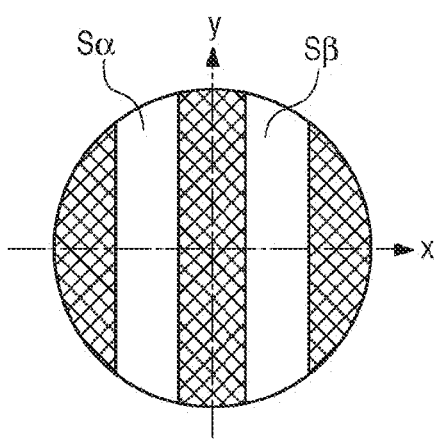
FIG. 20 is an explanatory view of a solid-state image sensor.

A method of determining the widths of the image correction filters in step S103 will be explained in detail next with reference to FIGS. 19A and 19B. FIGS. 19A and 19B are diagrams representing light beams which strike the image sensing element upon defocusing. FIG. 19A is a diagram showing a light beam in front focus. Reference symbol Zaf denotes the distance from the image sensing plane of the image sensing element 107 to the pupil plane Me; Raf, the width of the pupil plane Me in the horizontal direction, at which a light beam is limited by the pupil plane Me in accordance with the eclipse information obtained in step S2; and Def, the tentative amount of defocus obtained in step S5. As is apparent from FIG. 19A, an image extends at a width Wf on the image sensing plane of the image sensing element 107. Hence, taking account of the fact that Def is negative at the time of front focus, the width Wf is given by:

$$Wf = \left| \frac{Raf \times Def}{Zaf + Def} \right| \tag{8}$$

Similarly, a relationship as shown in FIG. 19B holds and equation (8), in turn, holds at the time of rear focus as well as the time of front focus. The widths Wf obtained by equation (8) become those of the image correction filters.

Next, the lower filter is adjusted by raising its gain so that the two image correction filters are on the same level. This is because the object images A and B have undergone shading correction during the first correlation calculation in step S101. The waveform is moved to match the centroids of the image correction filters for the object images A and B. This is to limit the amount of change in the base length which changes upon the filter processing in step S104 so that this amount is attributed only to deformation of the corrected object images A and B upon the filter processing.

A method of calculating a base length in step S105 will be explained in detail next. First, a line image (to be referred to as a line image A hereinafter) corresponding to the object image A and a line image (to be referred to as a line image B hereinafter) corresponding to the object image B are moved so that their centroids match each other. The moved line images A and B are defined as line images A0 and B0, respectively. A corrected base length is calculated based on the distance between the centroid of a corrected line image A obtained by convolution integration of the line image B0 into the line image A and that of a corrected line image B obtained by convolution integration of the line image A0 into the line image B. This calculation is expressed by the following equations.

Letting MA(x) be the corrected line image A, LA(x) be the line image A, and LB'(x) be the line image B0, the corrected line image A is calculated by:

$$M_A(x) = \int_{-\infty}^{\infty} L_A(x) \cdot L'_B(x-b)db \tag{9}$$

Then, a centroid $G_A'$ of the corrected line image A is given by:

$$G'_A = \frac{\int_{-\infty}^{\infty} x \cdot M_A(x)dx}{\int_{-\infty}^{\infty} M_A(x)dx} \tag{10}$$

Similarly, letting MB(x) be the corrected line image B, LB(x) be the line image B, and LA'(x) be the line image A0, the corrected line image B is calculated by:

$$M_B(x) = \int_{-\infty}^{\infty} L_B(x) \cdot L'_A(x-a)da \tag{11}$$

Then, a centroid $G_B'$ of the corrected line image B is given by:

$$G'_B = \frac{\int_{-\infty}^{\infty} x \cdot M_B(x)dx}{\int_{-\infty}^{\infty} M_B(x)dx} \tag{12}$$

Hence, we have a base length G':

$$G' = |G_A' - G_B'| \tag{13}$$

A base line is calculated in the foregoing way.

With the above-mentioned arrangement, a correction calculator (CPU 121) continuously performs focus detection a plurality of times while updating eclipse correction parameters in accordance with the amount of defocus detected by a focus detection means (CPU 121). This allows more precise eclipse correction using a more accurate amount of defocus and, in turn, allows more accurate focus detection.

More specifically, the widths of the image correction filters are determined using more accurate latest defocus information (DEF(N-1)) in the process of step S103, and this allows more precise eclipse correction and, in turn, allows more accurate focus detection. Also, in the process of step S101, shading correction is performed by estimating shadings of the object images A and B from the latest defocus information (DEF(N-1)). This allows more precise eclipse correction and, in turn, allows more accurate focus detection especially when the lens used has shading correction coefficients which largely change depending on the amount of defocus, like a microlens.

Also, in the process of step S102, line spread functions are calculated from the latest defocus information (DEF(N-1)). This allows more precise eclipse correction and, in turn, allows more accurate focus detection especially when the lens used has line spread functions which largely change depending on the amount of defocus, like a microlens.

Although a known image shift scheme is adopted in correlation calculation in this embodiment, the same result can be obtained even by using other methods. Also, in this embodiment, an image correction process is performed using correction filters in which line images corresponding to two object images after shading correction are on the same level. However, image correction may be performed by convolution integration of object images before shading correction, using correction filters which are not on the same level.

Also, although a focus calculation method which employs, as a photo-electric conversion means, an image sensing element including a C-MOS sensor and its peripheral circuits has been exemplified in this embodiment, this method is available even for a focus detection apparatus of the pupil division scheme in a conventional single-lens reflex camera which employs a line sensor as a photo-electric conversion means.

The determination means in this embodiment employs a method of determining, based on the convergence state of the calculated amount of defocus, whether to perform recalculation in step S10. However, this determination may be done based on the convergence states of other characteristics such as eclipse correction parameters to be repeatedly calculated, such as the shading correction value, the line image shape, and the base length, or the amounts of shift between the images A and B. Alternatively, this determination may be done based only on whether N indicating the number of times of a defocus amount calculation process exceeds a predetermined number of times. Or again, the focus detection sequence may be determined to prevent excessive prolongation of the calculation time, due to an increase in the number of times of repeated calculation, while primarily achieving focus detection within a necessary accuracy by performing that determination based on the combination of the convergence state and the number of times N but not performing repeated calculation in excess of a predetermined number of times.

Although the determination means in this embodiment adopts a fixed determination threshold for use in determination as to whether to perform recalculation in step S10, a variable determination threshold may be adopted. For example, the fact that the depth of field is proportional to the F-number can be exploited. In this case, the calculation time can be further shortened, especially under a condition in which the F-number is large, by making the convergence determination threshold proportional to the F-number to match the determination threshold with a necessary focus detection accuracy. Alternatively, if the object has a low luminance and therefore the obtained image signal has a low S/N ratio or the object has low contrast, a variation in defocus amount calculation result is large, so the convergence can be improved by making the convergence determination threshold proportional to an estimated variation in calculation result in accordance with the object contrast or luminance information.

Second Embodiment

The first and second embodiments are the same in arrangement of a camera, but are different in focus detection sequence. The focus detection sequence in the second embodiment will be described with reference to a focus detection sequence shown in FIG. 21 and a correlation calculation sequence shown in FIG. 22.

Figure 21:
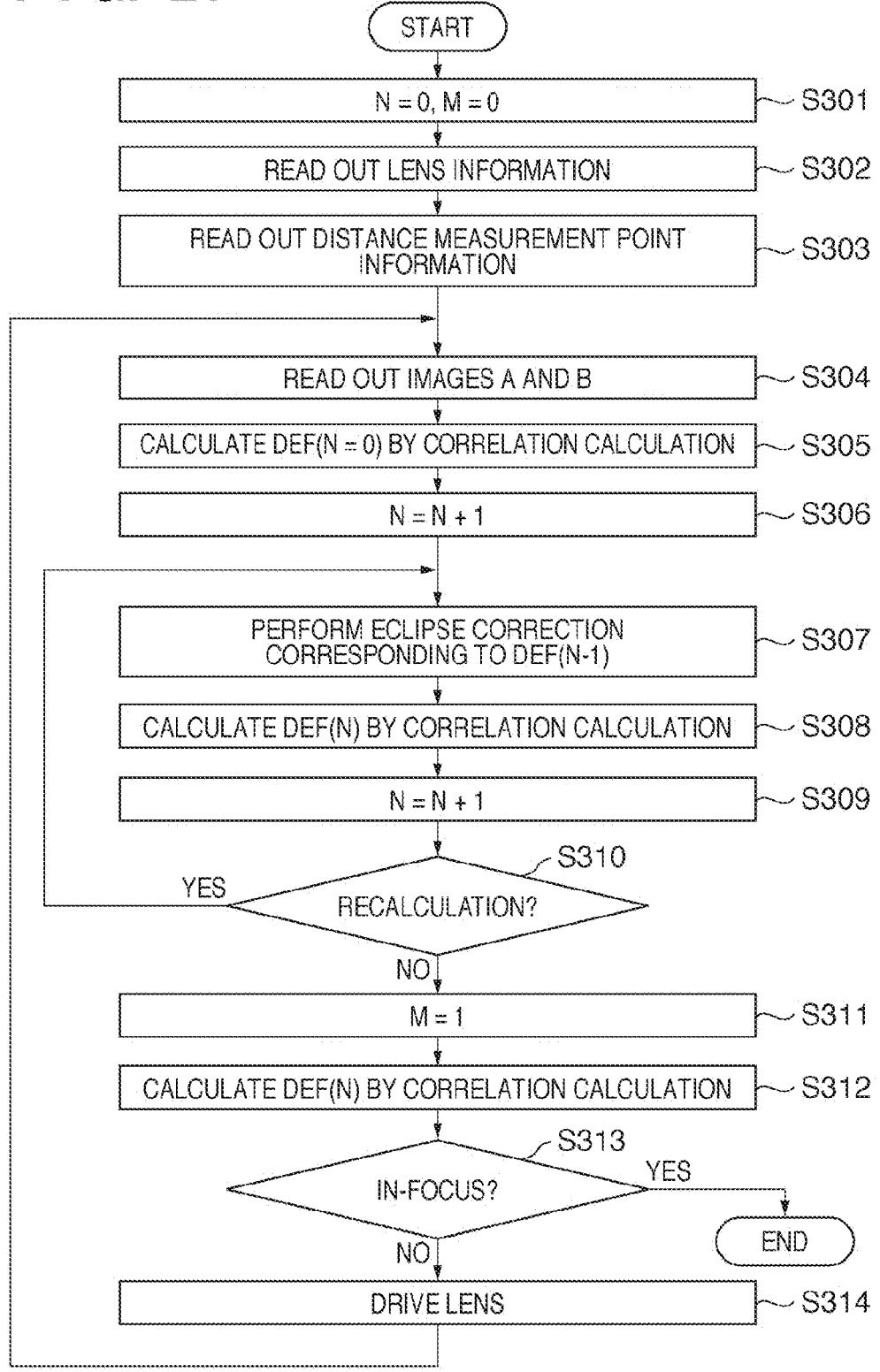
FIG. 21 is a flowchart of a focus detection sequence.
Figure 22:
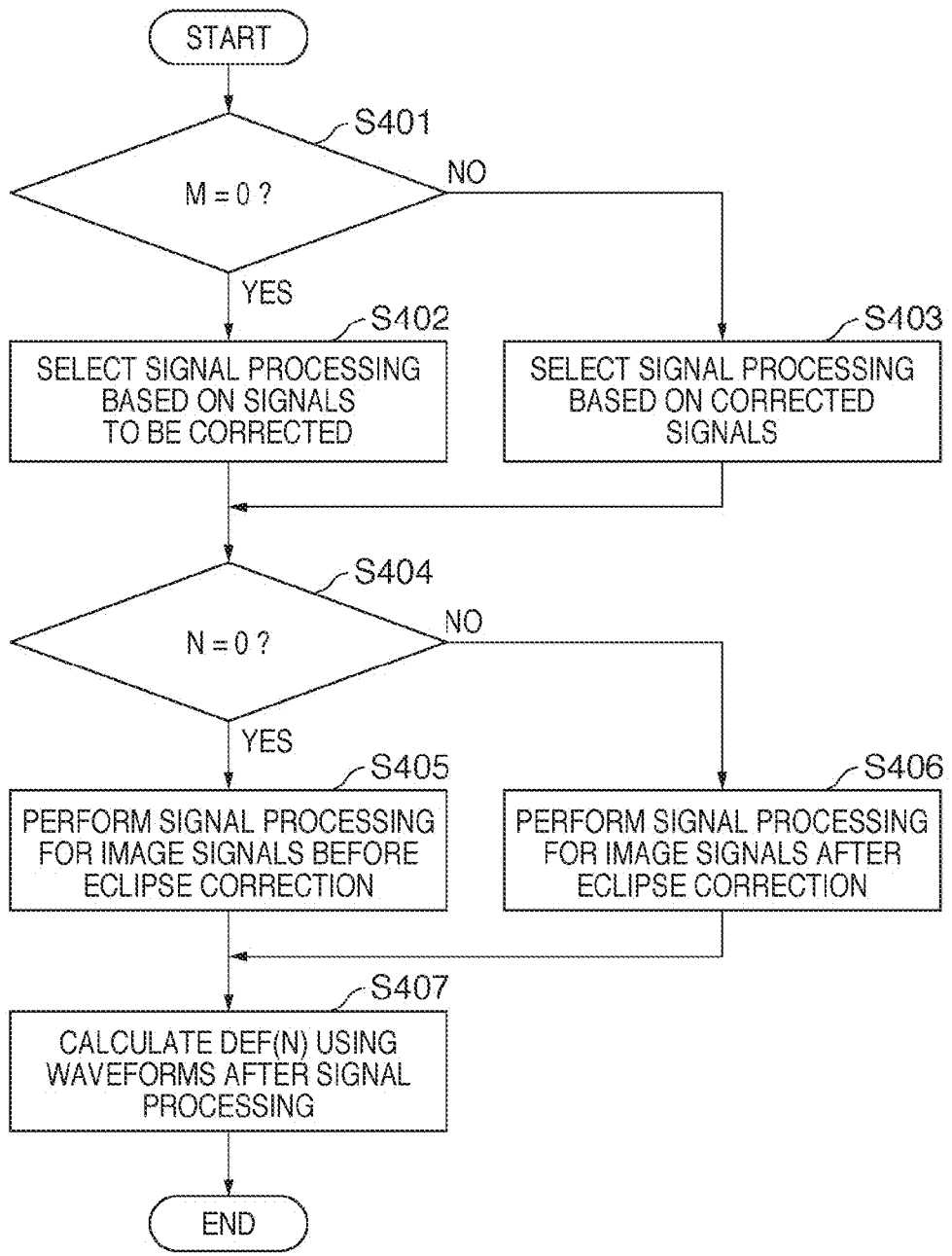
FIG. 22 is a flowchart of a correlation calculation sequence.

Note that a CPU 121 serving as all of a correction calculator, focus detection means, and determination means performs the operations in the sequences shown in FIGS. 21 and 22. Also, the focus detection means includes a signal processing selection means and signal processing means, and performs focus detection after performing optimum signal processing for an image signal.

When a focus detection operation starts, 0 is substituted for N indicating the number of times of a defocus amount calculation process in step S301. Also, 0 is substituted for M indicating whether repeated calculation while updating eclipse correction parameters has converged, and the process advances to step S302.

Figure 17:
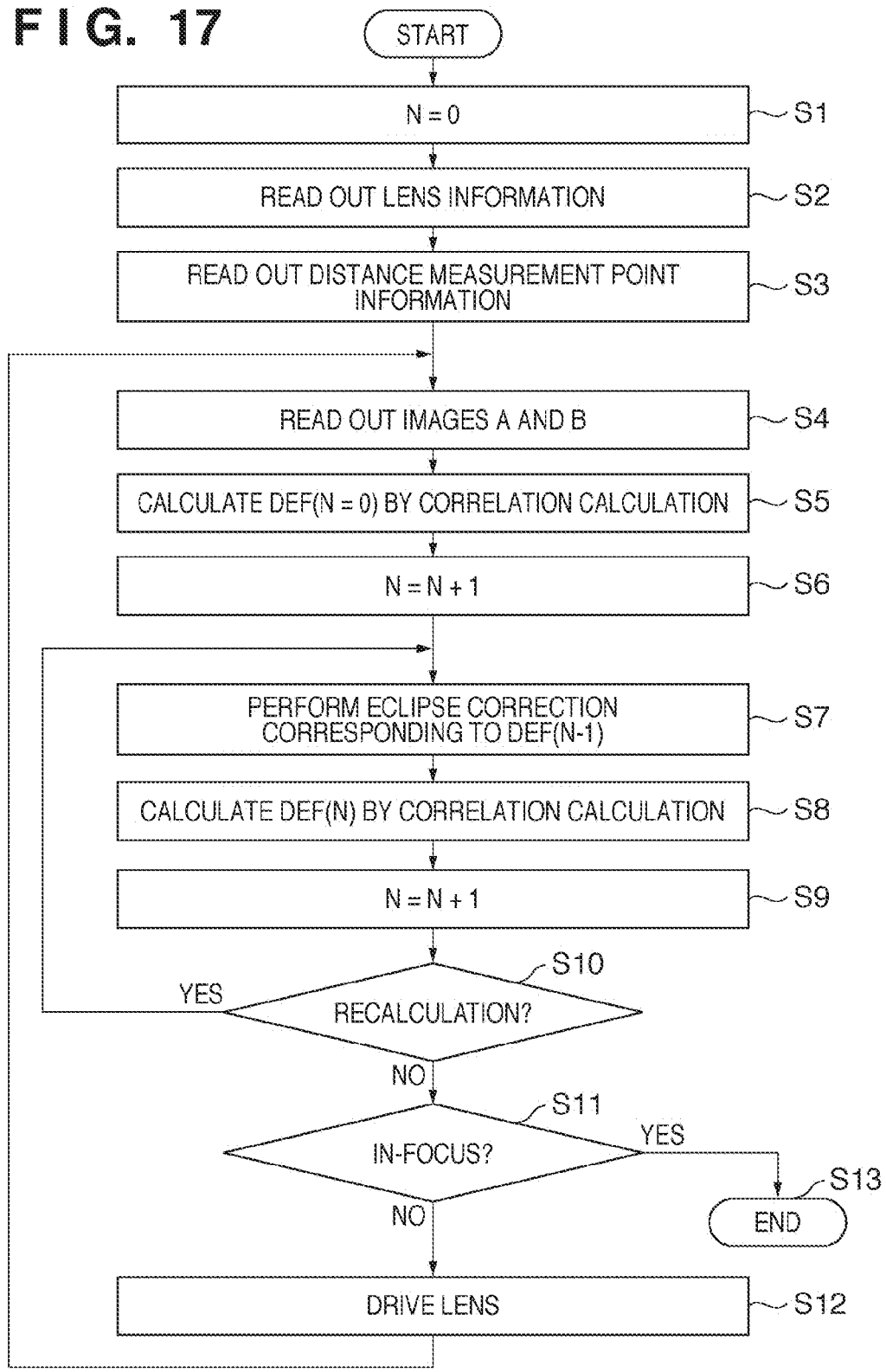
FIG. 17 is a flowchart showing a focus detection operation.
Figure 18:
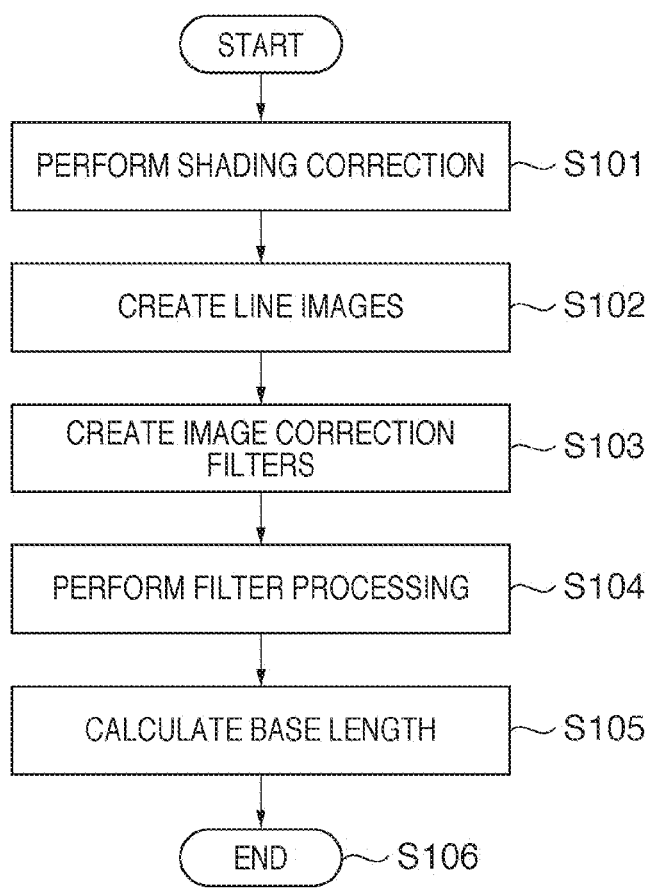
FIG. 18 is a flowchart showing an eclipse correction operation.

Steps S302 to S310 are the same as steps S2 to S10, respectively, in FIG. 17 described in the first embodiment, and a description thereof will not be given herein. In step S311, 1 is substituted for M, and the process advances to step S312. In step S312, correlation calculation is performed again.

Steps S313 and S314 are the same as steps S11 and S12, respectively, in FIG. 17 described in the first embodiment, and a description thereof will not be given.

A correlation calculation process performed by the focus detection means in steps S305, S308, and S312 will be described in detail next with reference to a correlation calculation sequence shown in FIG. 22.

In step S401, it is determined whether M=0. M in this sequence is the same as that in the focus detection sequence. Hence, if repeated calculation while updating eclipse correction parameters has converged, M=1; otherwise, M=0. If M=0 is determined, the process advances to step S402. If M≠0, the process advances to step S403.

In step S402, the signal processing selection means selects signal processing based on signals to be corrected. The signals to be corrected mentioned herein mean signals of object images A and B before eclipse correction, which are read out from focus detection pixels. Signal processing and signal processing selection from a plurality of types of signal processing are performed using known techniques in order to more accurately perform image shift amount detection in step S407.

The CPU 121 stores a plurality of types of signal processing such as filter processing for reducing the influence of the difference in signal intensity level between the object images A and B, or that for amplifying or attenuating specific frequency components.

If the signal to be corrected has relatively low contrast or relatively low luminance, signal processing for amplifying a relatively low spatial frequency range as compared with a case in which the contrast or luminance is not low is selected. After signal processing is selected, the process advances to step S404.

In step S403, the signal processing selection means selects signal processing based on corrected signals. The corrected signals mentioned herein mean signals of object images A and B after eclipse correction in step S307.

In step S404, it is determined whether N=0. N in this sequence is the same as that in the focus detection sequence shown in FIG. 21. Hence, N indicates the number of times of a defocus amount calculation process, which is equal to the number of times of previous eclipse correction. If N=0 is determined, the process advances to step S405. If N≠0, the process advances to step S406.

In step S405, the signal processing means processes the signals of object images A and B before eclipse correction. After the signal processing, the process advances to step S407.

In step S406, the signal processing means processes the signals of object images A and B after eclipse correction. After the signal processing, the process advances to step S407.

In step S407, the amount of image shift is detected and the amount of defocus is calculated by a known technique using the processed signals.

With the above-mentioned arrangement, signal processing for more precisely performing image shift amount detection for image signals read out from focus detection pixels, and thereafter the amount of image shift is detected. This makes it possible to more accurately perform focus detection.

Also, even when object images are changed by updating eclipse correction parameters during repeated calculation while updating eclipse correction parameters, the signal processing used remains the same. This makes it possible to more precisely determine whether the amount of defocus has converged. This, in turn, makes it possible to more accurately perform focus detection.

Moreover, optimum signal processing is selected and performed for image signals after eclipse correction when repeated calculation while updating eclipse correction parameters has converged. This makes it possible to more accurately perform focus detection.

Although a preferred embodiment of the present invention has been described above, the present invention is not limited to this embodiment, and various modifications and changes can be made without departing from the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-115920 filed May 12, 2009 and 2010-101439 filed Apr. 26, 2010 which are hereby incorporated by reference herein in their entirety.

The invention claimed is:

1. A focus detection apparatus comprising:
a photo-electric conversion unit comprising a first pixel group which receives a light beam passing through a first pupil area of an image forming optical system that forms an image of an object, and a second pixel group which receives a light beam passing through a second pupil area of the image forming optical system;
a focus detection unit configured to detect a focus state of the image forming optical system based on a first object image generated by the first pixel group and a second object image generated by the second pixel group;
a correction calculator configured to perform correction calculation for the first object image and the second object image based on the output from the focus detection unit; and
a determination unit configured to determine, based on the output from the focus detection unit, whether to perform the correction calculation again,
wherein the correction calculator calculates a first line image corresponding to the first pupil area of the image forming optical system, and a second line image corresponding to the second pupil area of the image forming optical system, and
wherein the correction calculator generates a first image signal by convolution integration of the second line image into the first object image, and generates a second image signal by convolution integration of the first line image into the second object image.

2. The apparatus according to claim 1, wherein the correction calculator performs shading correction for the first object image and the second object image.

3. A focus detection apparatus comprising:
an image forming optical system which forms an image of an object;
a photo-electric conversion unit comprising a first pixel group which receives a light beam passing through a first pupil area of the image forming optical system, and a second pixel group which receives a light beam passing through a second pupil area of the image forming optical system;
a focus detection unit configured to detect a focus state of the image forming optical system;
a correction calculator configured to perform, based on the output from the focus detection unit, correction calculation for a first object image generated by the first pixel group of the photo-electric conversion unit, and a second object image generated by the second pixel group of the photo-electric conversion unit;
a signal processing selection unit configured to select, based on the outputs of the object images, optimum signal processing from a plurality of types of signal processing having different characteristics;
a signal processing unit configured to perform the signal processing selected by the signal processing selection unit for the object images; and
a determination unit configured to determine, based on the output from the focus detection unit, whether to perform the correction calculation again,
wherein the signal processing is selected based on signals before the correction calculation, before the determination unit determines that the correction calculation is not to be performed again.

4. The apparatus according to claim 3, wherein the signal processing unit amplifies or attenuates specific frequency components in the signals.

5. The apparatus according to claim 3, wherein the signal processing is selected based on signals after the correction calculation, after the determination unit determines that the correction calculation is not to be performed again.

6. A focus detection apparatus comprising:
a photo-electric conversion unit comprising a first pixel group which receives a light beam passing through a first pupil area of an image forming optical system that forms an image of an object, and a second pixel group which receives a light beam passing through a second pupil area of the image forming optical system;

a focus detection unit configured to detect a defocus amount of the image forming optical system based on a first object image generated by the first pixel group and a second object image generated by the second pixel group;

a correction calculator configured to acquire the defocus amount output from the focus detection unit, wherein the correction calculator is configured to generate a filter for correcting the first object image and the second object image based on the acquired defocus amount, and wherein the correction calculator is configured to correct the first object image and the second object image based on the generated filter; and a determination unit configured to determine, based on the output from the focus detection unit, whether to make the focus detection unit detect the defocus amount by using the corrected first object image and the corrected second object image.

7. The apparatus according to claim 6, wherein the correction calculator calculates a first line image corresponding to the first pupil area of the image forming optical system, and a second line image corresponding to the second pupil area of the image forming optical system.

8. The apparatus according to claim 7, wherein the correction calculator generates a first image signal by convolution integration of the second line image into the first object image, and generates a second image signal by convolution integration of the first line image into the second object image.

9. The apparatus according to claim 6, wherein the correction calculator performs shading correction for the first object image and the second object image.

* * * * *